(12) United States Patent
Fujii et al.

(10) Patent No.: US 12,293,162 B2
(45) Date of Patent: May 6, 2025

(54) SEMICONDUCTOR DEVICE, DATA GENERATION METHODS USED FOR THE SAME, AND METHOD OF CONTROLLING THE SAME

(71) Applicant: RENESAS ELECTRONICS CORPORATION, Tokyo (JP)

(72) Inventors: Taro Fujii, Tokyo (JP); Katsumi Togawa, Tokyo (JP); Teruhito Tanaka, Tokyo (JP); Takao Toi, Tokyo (JP)

(73) Assignee: RENESAS ELECTRONICS CORPORATION, Tokyo (JP)

( * ) Notice: Subject to any disclaimer, the term of this patent is extended or adjusted under 35 U.S.C. 154(b) by 956 days.

(21) Appl. No.: 17/358,579

(22) Filed: Jun. 25, 2021

(65) Prior Publication Data

US 2022/0004363 A1 Jan. 6, 2022

(30) Foreign Application Priority Data

Jul. 2, 2020 (JP) .................................. 2020-114592

(51) Int. Cl.
*G06F 7/544* (2006.01)
*G06F 7/53* (2006.01)
(Continued)

(52) U.S. Cl.
CPC .......... *G06F 7/5443* (2013.01); *G06F 7/5306* (2013.01); *G06F 17/16* (2013.01); *G06F 2207/4824* (2013.01); *G06N 3/08* (2013.01)

(58) Field of Classification Search
CPC ........ G06F 7/5443; G06F 7/53; G06F 7/5306; G06F 17/16; G06F 2207/4824; G06N 3/063; G06N 3/08
See application file for complete search history.

(56) References Cited

U.S. PATENT DOCUMENTS

2018/0129935 A1* 5/2018 Kim ...................... G06F 17/153
2019/0087713 A1* 3/2019 Lamb .................... G06F 7/5443
(Continued)

FOREIGN PATENT DOCUMENTS

JP 2019-219753 B2 12/2019

OTHER PUBLICATIONS

Notice of Reasons for Refusal dated Apr. 2, 2024, from corresponding JP Application No. 2020-114592, 11 pages.

*Primary Examiner* — Emily E Larocque
(74) *Attorney, Agent, or Firm* — Rimon P.C.

(57) ABSTRACT

A semiconductor device includes: a local memory outputting a plurality of pieces of weight data in parallel; a plurality of product-sum operation units corresponding to the plurality of pieces of weight data; and a plurality of unit selectors corresponding to the product-sum operations units, supplied with a plurality of pieces of input data in parallel, selecting the one piece of input data from the supplied plurality of pieces of input data according to a plurality of pieces of additional information each indicating a position of the input data to be calculated with the corresponding product-sum arithmetic unit calculator in the pieces of input data, and outputting the selected input data. Each of the plurality of product-sum arithmetic units performs a product-sum operation between the weight data different from each other in the plurality of pieces of weight data and the input data outputted from the corresponding unit selector.

8 Claims, 29 Drawing Sheets

(51) Int. Cl.
  *G06F 17/16* (2006.01)
  *G06N 3/08* (2023.01)

(56) References Cited

U.S. PATENT DOCUMENTS

2019/0384574 A1    12/2019  Fujii et al.
2020/0104692 A1*   4/2020   Hill ...................... G06N 3/0464
2021/0097130 A1*   4/2021   Liu ...................... H03M 7/3066

* cited by examiner

FIG. 5

FIRST-ROW DATA OF
MATRIX DATA IN
(m=20)

$$\begin{bmatrix} b_0 & b_1 & \cdots & b_{19} \end{bmatrix}$$

×

MATRIX DATA W
(m=20, n=20)

$$\begin{pmatrix} a_{0,0} & a_{0,1} & \cdots & a_{0,19} \\ a_{1,0} & a_{1,1} & \cdots & a_{1,19} \\ a_{19,0} & a_{19,1} & \cdots & a_{19,19} \end{pmatrix}$$

=

$$\begin{Bmatrix} (a_{0,0} \times b_0 + a_{1,0} \times b_1 + \cdots + a_{19,0} \times b_{19}) & (a_{0,1} \times b_0 + a_{1,1} \times b_1 + \cdots + a_{19,1} \times b_{19}) & \cdots & (a_{0,19} \times b_0 + a_{1,19} \times b_1 + \cdots + a_{19,19} \times b_{19}) \end{Bmatrix}$$

SEMICONDUCTOR DEVICE, DATA GENERATION METHODS USED FOR THE SAME, AND METHOD OF CONTROLLING THE SAME

CROSS-REFERENCE TO RELATED APPLICATIONS

The present application claims priority from Japanese Patent Application No. 2020-114592 filed on Jul. 2, 2020, the content of which is hereby incorporated by reference to this application.

BACKGROUND

The present invention relates to a semiconductor device, data generation methods used for the same, and a method of controlling the same, for example, a semiconductor device, which performs an arithmetic processing such as a deep learning processing, data generation methods used the same, and a method of controlling the same.

There are disclosed techniques listed below. [Patent Document 1] Japanese Unexamined Patent Application Publication No. 2019-219753

Patent Document 1 discloses a semiconductor device performing a large-scale arithmetic processing such as a deep learning processing, for example. This Patent Document 1 discloses, for example in FIG. 10, a parallel arithmetic unit (121) for performing a arithmetic processing necessary for the deep learning processing.

SUMMARY

In Patent Document 1, as shown in FIG. 10 thereof, data is supplied to the parallel arithmetic unit (121) from a local memory (122), and the parallel arithmetic unit (121) performs a product-sum operation in parallel. That is, the processing is performed by a SIMD (Single Instruction Multiple Data) type. The inventors of the present invention have examined a reduction in a processing time while utilizing the technique disclosed in Patent Document 1.

FIG. 28 is a block diagram showing a configuration of a parallel arithmetic circuit as a comparative example that has been examined by the inventors of the present invention. Further, FIG. 29 is a view showing an operation of the parallel arithmetic circuit shown in FIG. 28.

In FIG. 28, the reference symbols mem_a to mem_n show local memories, and the reference symbol mul shows a multiplier. Further, the reference symbols AD_a to AD_n show computing units that perform addition and accumulation. If a local memory mem_a is explained as an example, weight data A, B, C outputted from the local memory mem_a are supplied to a corresponding multiplier mul, and are multiplied by input data a, b, c through the corresponding multiplier mul. Respective multiplied results are supplied to the corresponding a computing unit AD_a and are added. By repeating the above-mentioned operation while the input data and the weight data are varied, a product-sum operation of the input data and the weight data is performed and a matrix operation as shown in FIG. 29 can be performed.

Adopting the configuration as explained above makes it possible to reduce a processing time of the product-sum operation. However, a problem arises in that a plurality of pieces of weight data a, b, c require being substantially simultaneously read from the respective local memories mem_a to mem_n. Further, a problem arises in that the multiplier which performs an operation at 8-bit width is increased in number, and an occupied (exclusive) area is increased.

A semiconductor device according to one embodiment is as follows.

That is, a semiconductor device includes:
a memory outputting a plurality of pieces of first data in parallel;
a plurality of product-sum operation units corresponding to the plurality of pieces of first data; and
a plurality of selectors: corresponding to the plurality of product-sum operation units; supplied with a plurality of pieces of second data in parallel; selecting one piece of second data from the supplied plurality of pieces of second data according to additional information indicating a position of one piece of second data to be calculated with one piece of first data by the corresponding product-sum operation units among the plurality of pieces of second data; and outputting the selected second data,
wherein each of the plurality of product-sum operation units performs a product-sum operation between the first data different from each other in the plurality of first data and the second data outputted from the corresponding selectors.

The other objects and novel characteristics of the present invention will be apparent from the description of the present specification and the accompanying drawings.

According to the one embodiment, provided can be: a semiconductor device capable of reducing the processing time; data generation methods used for the same; and a method of controlling the same.

BRIEF DESCRIPTION OF THE DRAWINGS

FIG. 5 is a diagram for explaining the processing at the parallel arithmetic unit according to the first embodiment.

DETAILED DESCRIPTION

Figure 1:
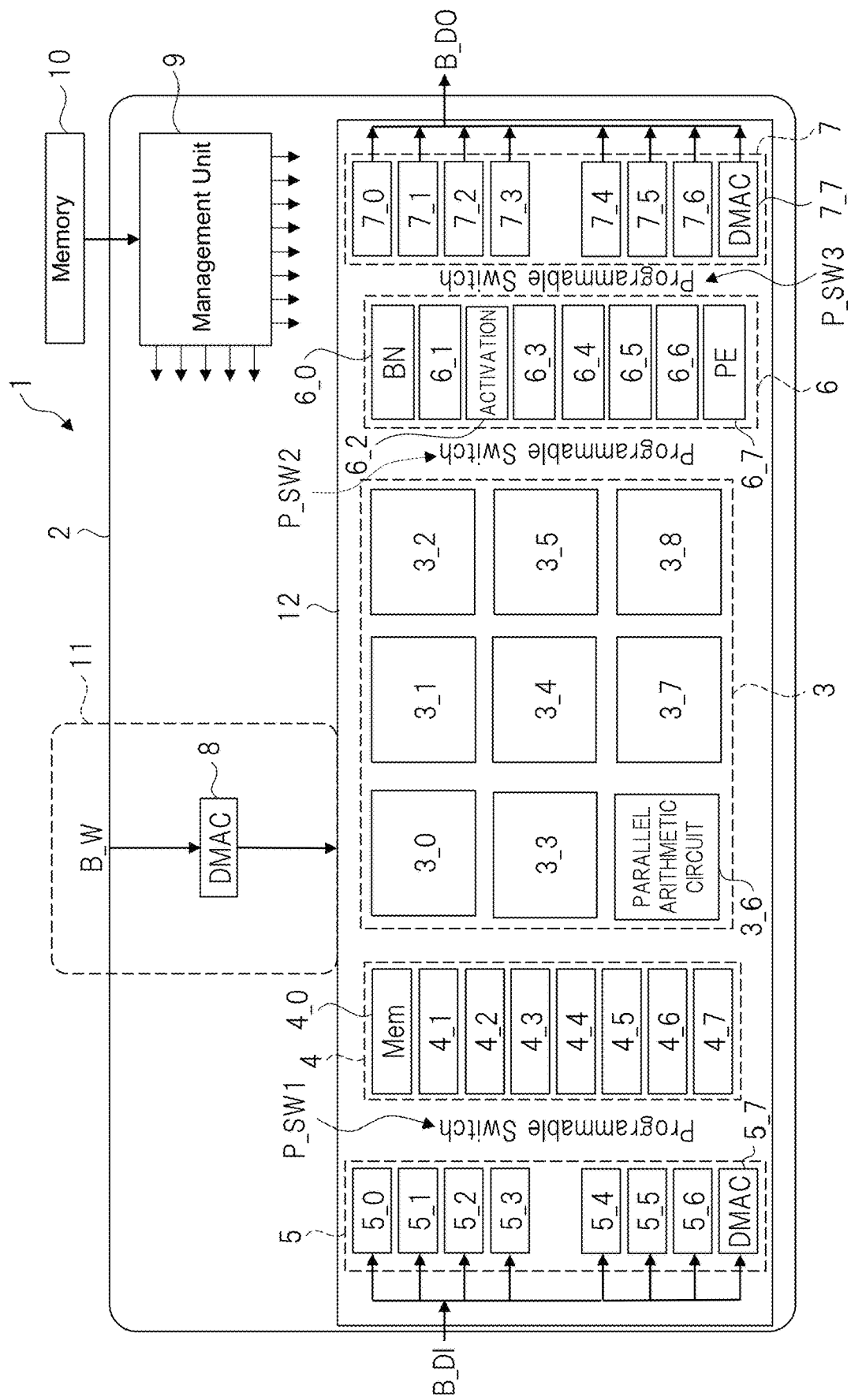
FIG. 1 is a block diagram showing a configuration of a semiconductor device according to a first embodiment.

Hereinafter, embodiments of the present invention will be described in detail with reference to the accompanying drawings. Note that the disclosure is mere an example, and it is a matter of course that any alteration that is easily made by a person skilled in the art while keeping a gist of the present invention is included in the present invention. In addition, the drawings schematically illustrate a width, a thickness, a shape and the like of each portion as compared to actual aspects in order to make the description clearer, but the drawings are mere examples and do not limit the interpretation of the present invention.

In addition, the same reference characters are applied to the same elements as those described in relation to the foregoing drawings in the present specification and the respective drawings, and detailed descriptions thereof will be appropriately omitted in some cases.

Hereinafter, a semiconductor device suitable for a deep learning processing will be explained as an example. However, the deep learning processing is an example, and a semiconductor device and a controlling method, which will be explained later, may perform a large-scale arithmetic processing etc.

A first embodiment is different from second and third embodiments in means for solving the above-mentioned two problems, so that respective outlines of them will be described here.

First Embodiment

In a first embodiment, data that has little influence in performing a product operation among weight data arranged in a matrix, for example, data corresponding to the numerical value 0 is compressed and stored in a local memory. Consequently, a supply of the weight data that has little influence in performing the product calculation is omitted, and significant weight data is supplied to a parallel arithmetic circuit. That is, a plurality of pieces of significant weight data are supplied to the parallel arithmetic circuit substantially at the same time. Further, the parallel arithmetic circuit is provided with a selector for selecting input data, which is used for a product-sum operation, from a plurality of pieces of input data. This makes it possible to provide a common product arithmetic unit to the plurality of pieces of input data, suppress an increase in the product arithmetic unit, and suppress an increase in an occupied area of the parallel arithmetic circuit.

Although not particularly limited, for example, the weight data often becomes data corresponding to the numerical value 0 in learning for a sparse model, so that the parallel arithmetic circuit according to the first embodiment is effective.

Second and Third Embodiments

In second and third embodiments, multi-bit data is used as pieces of weight data arranged in a matrix similarly to a conventional technique. Meanwhile, a value used for calculation has a narrow bit width, and the multi-bit has a form in which a plurality of narrow bits are bundled. This makes it possible to increase the number of pieces of weight data outputted to the parallel arithmetic circuit at the same time while the local memory has the same weight data width as the conventional one. Further, a computing unit that performs an operation between narrow bit width data (weight) and multi-bit width input data can have a smaller occupied area than that of a product computing unit having multiple bit widths. Therefore, this makes it possible to suppress an increase in the occupied area of the parallel arithmetic circuit.

In the second embodiment, a binary example will be described as data having a narrow bit width. In this case, the weight data has a narrow bit width of 1 bit width. Further, in the third embodiment, a ternary example will be described as data having a narrow bit width. Since at least 2 bits are required to represent the ternary value, the weight data has a narrow bit width of 2 bits.

Of course, the second and third embodiments do not require an operation of compressing the weight data as described in the first embodiment.

In this way, any of the first to third embodiments can also solve the above-mentioned two problems, and a processing time can be made short while the increase in the occupied area is suppressed. Additionally, since the reduction in the processing time can be realized only by adding a small-scale circuit to a configuration of the conventional technique, this embodiment becomes an embodiment that easy coexists with the conventional configuration.

Next, a semiconductor device according to each of the first to third embodiments will be described.

First Embodiment

<Configuration of Semiconductor Device>

FIG. 1 is a block diagram showing a configuration of a semiconductor device according to a first embodiment. In FIG. 1, the reference numeral 1 denotes a semiconductor device, and the reference numeral 2 denotes an array type processor mounted on the semiconductor device 1. Further, in the figure, reference numeral 10 denotes a memory. A circuit block other than the array type processor 2 and the memory 10 is also mounted on the semiconductor device 1, but it is omitted in the figure.

The array type processor 2 includes an array unit 12 for processing, a management unit 9, and a transfer path unit 11. The management unit 9 is supplied with a descriptor column from the memory 10, and manages the array unit 12 according to the descriptor column. The transfer path unit 11 is connected between a bus B_W, which transfers the weight data etc., and the array unit 12, and transfers the weight data etc. to the array unit 12. The array unit 12 processes the input data from the bus B_DI and outputs, as output data, a processed result to a bus B_DO. When performing this processing, the array unit 12 uses the weight data etc.

<<Array Unit 12>>

The array unit 12 includes a plurality of circuit blocks described below. Although being schematic, an arrangement of circuit blocks in FIG. 1 is drawn according to an arrangement of the actual semiconductor chip. However, the arrangement of the circuit blocks is not limited to this.

As circuit blocks included in the array unit 12, FIG. 1 shows parallel arithmetic circuits 3_0 to 3_8, memory (Mem) 4_0 to 4_7, DMAC (Direct Memory Access Controller) 5_0 to 5_7, 7_0 to 7_7, and processor elements (hereinafter, also referred to as PE) 6_0 to 6_7. Further, as a circuit block, the array unit 12 includes programmable switches (hereinafter, also referred to as P switches) P_SW1 to P_SW3.

In the following description, when PEs 6_0 to 6_7 are collectively described, the reference numeral 6 is used as a symbol of the PE. Further, when the parallel arithmetic circuits 3_0 to 3_8 are collectively described, the reference numeral 3 is used as a symbol of the parallel arithmetic circuit. Similarly, the reference numeral 5 or 7 is used for the DMAC, the reference numeral 4 is used for the memory, and the reference numeral P_SW is used for the P switch.

The PE 6 is a circuit block capable of realizing various functions. The function realized by the PE 6 is determined by a control signal from the management unit 9. Further, the P switch P_SW also electrically connects the designated circuit blocks to each other by the control signal from the management unit 9. For example, a function of the predetermined PE 6 is set so as to perform predetermined calculation by the control signal from the management unit 9. Further, the predetermined P switch P_SW is set so as to connect, for example, the predetermined parallel arithmetic circuit 3 and the predetermined PE 6 by the control signal from the management unit 9. Here, an example in which the plurality of PEs 6 are provided in the array unit 12 has been described, but the present embodiment is not limited to this.

For example, a specific PE among the PEs 6_0 to 6_7 may be changed to a dedicated circuit block having a predetermined function. As explained with reference to FIG. 1, the PE of reference numeral 6_0 is changed to a dedicated circuit block BN, and the PE of reference numeral 6_2 is changed to a dedicated circuit block for performing an activation processing. Here, the reference numeral BN denotes a batch normalization function. In this way, changing the general-purpose PE to the dedicated circuit block makes it possible to achieve improvement in processing efficiency and speed.

The DMAC 5 transfers the input data to, for example, the predetermined parallel arithmetic circuit 3. The parallel arithmetic circuit 3 executes the product-sum operation in parallel between the weight data and the input data transferred by the DMAC 5. A function set in the PE 6 is applied to a calculation result(s) calculated by the parallel arithmetic circuit 3, and the result is outputted as output data by the DMAC 7.

Incidentally, as shown in FIG. 1, arranging the parallel arithmetic circuit 3 in a central portion of the array unit 12 makes it possible to reduce (shorten) a distance between the parallel arithmetic circuits 3. Therefore, the arrangement shown in FIG. 1 is suitable to a case where operation performance of the parallel arithmetic circuit 3 affects performance of a processing object application executed by the array type processor 2.

<<Management Unit 9, Memory 10, Transfer Path Unit 11, and Parallel Arithmetic Circuit 3>>

A plurality of descriptor columns are stored in the memory 10. Each of the descriptor columns includes information that specifies a function of the PE 6, information that determines a state of the P switch P_SW, and the like. When the descriptor column is supplied to the management unit 9, the management unit 9 decodes the descriptor column, generates the corresponding control signal, and supplies it to the array unit 12 and the like. Consequently, the array unit 12 realizes a processing according to the descriptor column stored in the memory 10 by a user. In other words, internal connection and state of the array unit 12 are determined by the management unit 9. Incidentally, the descriptor may include information about the parallel arithmetic circuit 3.

The transfer path unit 11 includes a DMAC 8. The DMAC 8 transfers weight data on the bus B_W to the parallel arithmetic circuit 3. As will be described later, the parallel arithmetic circuit 3 includes a local memory. The weight data is stored in this local memory. In the parallel arithmetic circuit 3, the product-sum operation is executed between the weight data and the data based on the input data. The parallel arithmetic circuit 3 will be described in detail later with reference to the drawings, and will not be described further here. Incidentally, the memory 4 is used when the processing is performed by the array unit 12.

<Arithmetic Processing in Deep Learning Processing>

Figure 2:
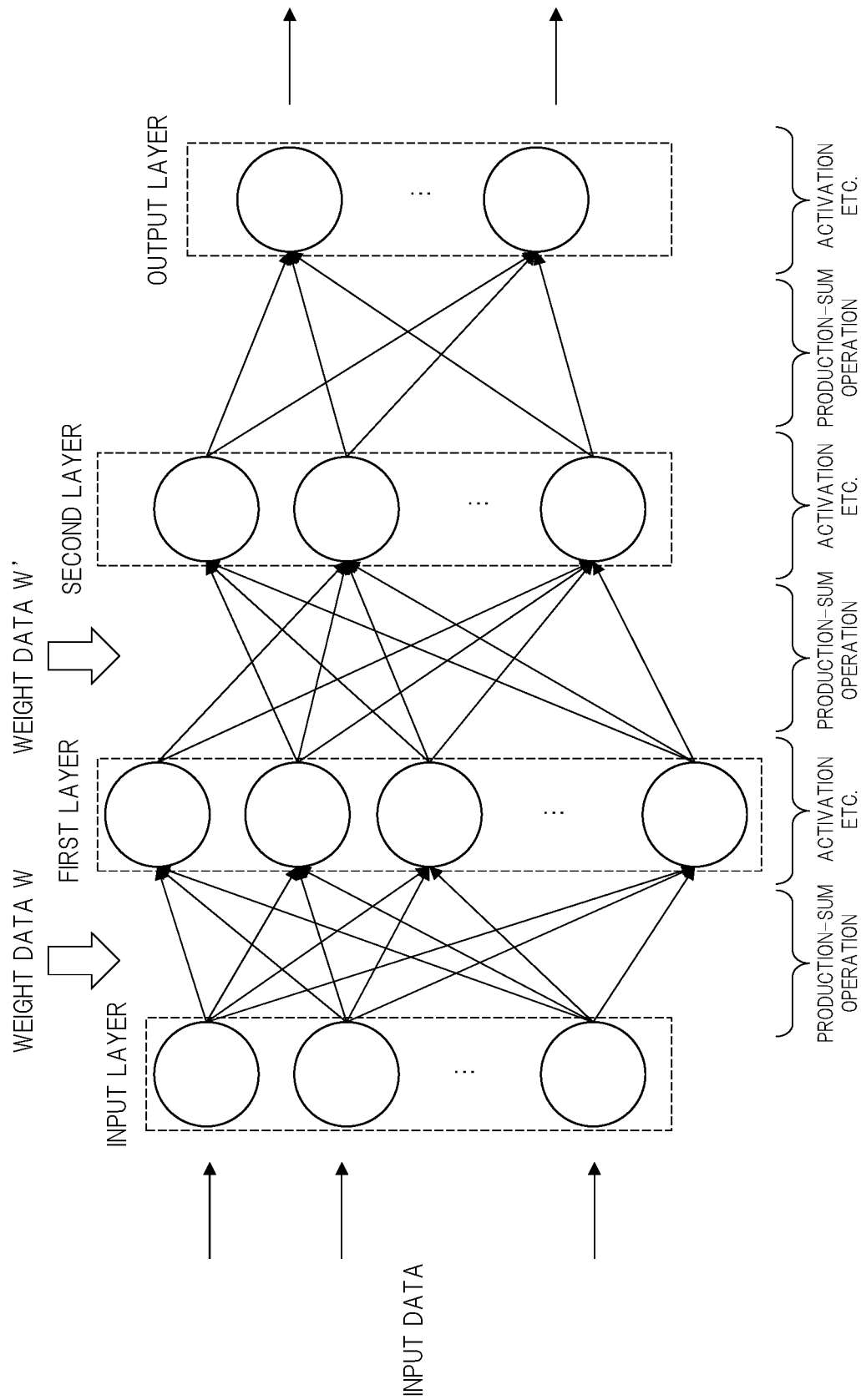
FIG. 2 is a view showing an example of a neural network configuration.
Figure 3:
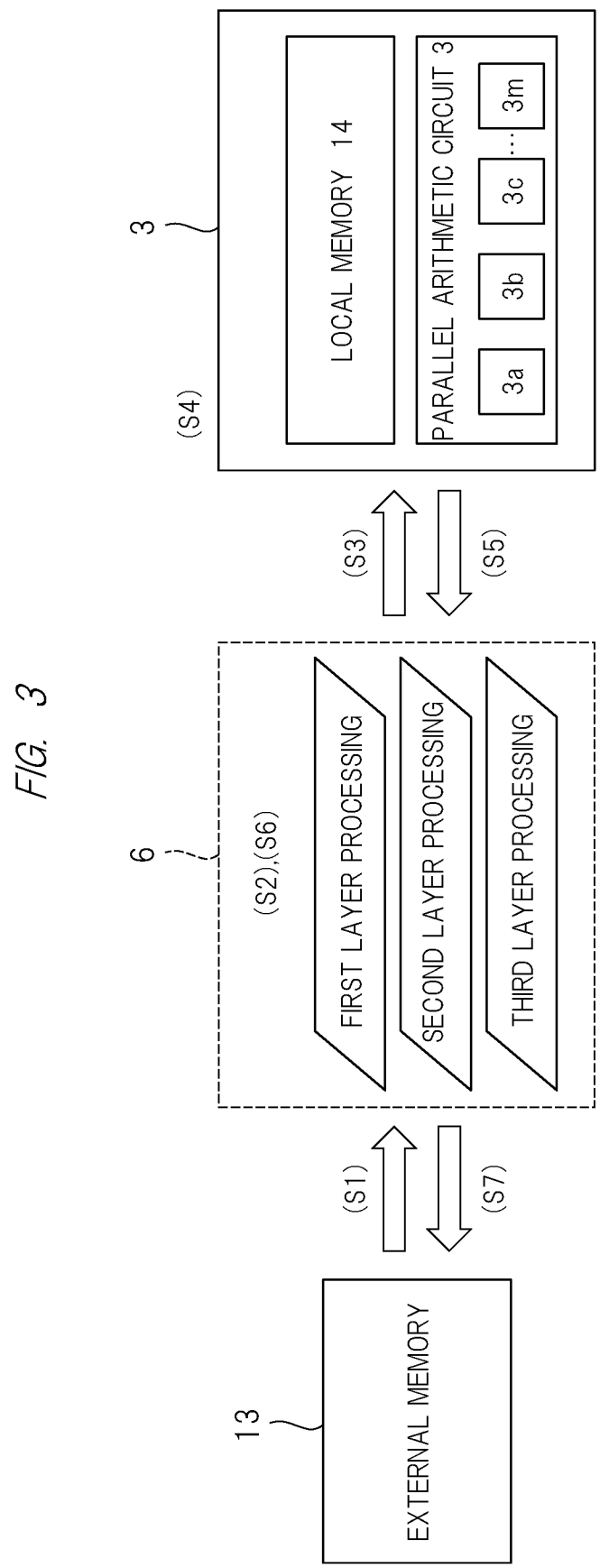
FIG. 3 is a schematic diagram showing a flow of an arithmetic processing of the neural network.

Next, an example of realizing a deep learning processing with the array type processor 2 shown in FIG. 1 will be described. Here, a processing of a neural network repeated for performing the deep learning processing will be described with reference to FIGS. 1 to 3. Here, FIG. 2 is a diagram showing an example of a neural network structure. FIG. 3 is a schematic diagram showing a flow of an arithmetic processing of a neural network.

The array type processor 2 shown in FIG. 1 is suitable for a convolutional processing executed in the deep learning processing. In the convolution processing, the same weight data is used very many times. In the array type processor 2, since the weight data is held in the local memory, the processing can be efficiently performed. FIG. 2 shows an example of full coupling in which the same weight data is not reused instead of the convolution processing. An outline of an arithmetic processing in the neural network will be described with reference to FIG. 2.

As shown in FIG. 2, taken in calculation of the neural network is procedure of: executing a product-sum operation that multiplies the input data by the weight data w (w'); executing an operation such as activation on a product-sum operation result(s); and outputting an operation result(s) thereof.

The array type processor 2 according to the first embodiment executes the procedure shown in FIG. 2 in the flow of the arithmetic processing as shown in FIG. 3. In FIG. 3, the reference numeral 13 denotes an external memory provided outside the array type processor 2, which is not particularly limited. The input data is stored in the external memory 13, and the operation result obtained by the array type processor 2 is written to the external memory 13 again. Further, the weight data w (w') is stored in the local memory 14 of the parallel arithmetic circuit 3.

In step S1, the array unit 12 reads out the input data (feature amount) required for the calculation from the external memory 13. In step S2, a configuration and state of the array unit 12 are set by the management unit 9, and the feature amount from the external memory 13 is sequentially supplied to the parallel arithmetic circuit 3 in step S3. The parallel arithmetic circuit 3 executes the product-sum operation processing in step S4 by multiplying the sequentially supplied feature amounts in order of their reception by the weight data w (w') stored in the local memory 14. The operation result of the product-sum calculation by the parallel arithmetic circuit 3 is sequentially outputted in step S5.

In the array unit 12, operations such as addition and activation are executed in step S6 as necessary for the data obtained by the parallel arithmetic circuit 3. In step S7, the array unit 2 writes, as another feature amount, an operation result in the external memory 13. The neural network processing is realized by such a processing and, by repeating this processing, an arithmetic processing necessary for the deep learning processing is executed.

In this way, in the array type processor 2 according to the first embodiment, a regular product-sum operation processing among the necessary arithmetic processings is executed by the parallel arithmetic circuit 3, so that high speed thereof can be realized. Further, an arithmetic processing(s) other than the product-sum operation processing is executed by the PE 6 whose circuit can be dynamically reconfigured by the management unit 9 or the like. This makes it possible to flexibly set processings such as activations in respective layers described as a first layer (first layer processing), a second layer (second layer processing), and an output layer (third layer processing) in FIGS. 2 and 3. Moreover, use of the number of parallel arithmetic circuits corresponding to the required arithmetic processing(s) becomes possible from the plurality of parallel arithmetic circuits 3 that are provided in advance in the array type processor 2. Similarly about the PE 6, use of the number of PEs etc. corresponding to the necessary arithmetic processing(s) becomes possible. That is, flexibility can be improved.

Incidentally, the reference numerals 3, 3a to 3m in FIG. 3 denote product-sum operation units included in one parallel arithmetic circuit 3 (for example, 3_0).

<<Product-Sum Operation>>

Figure 4:
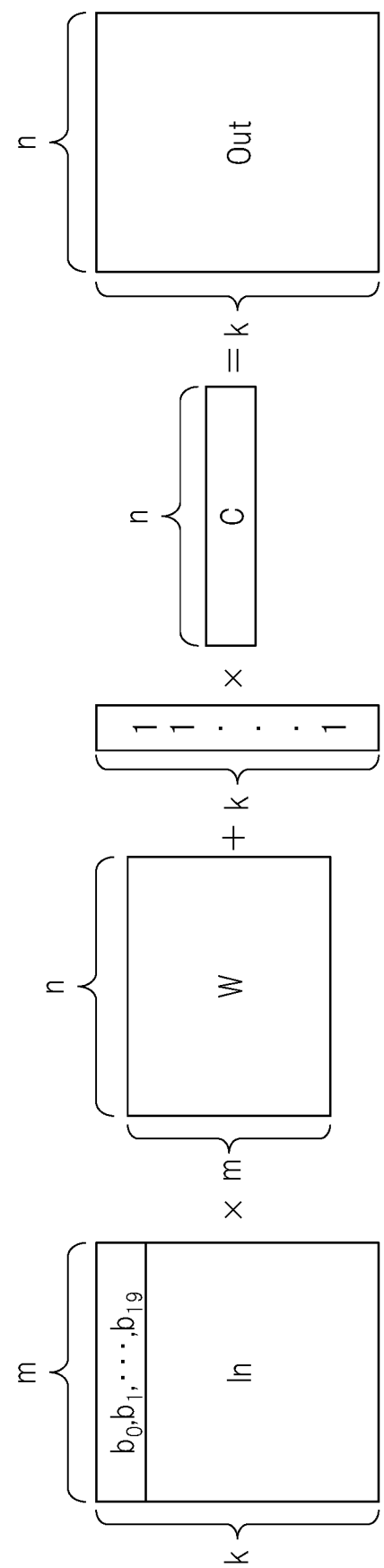
FIG. 4 is a diagram for explaining a processing at a parallel arithmetic unit according to the first embodiment.

Next, a specific example of the product-sum operation executed by the parallel arithmetic circuit 3 will be described with reference to the drawings. FIGS. 4 and 5 are diagrams for explaining processings executed in the parallel arithmetic unit according to the first embodiment. Here, FIG. 4 schematically shows a matrix operation formula, and FIG. 5 shows a matrix operation formula corresponding to that of FIG. 4.

In FIG. 4, the reference symbol In denotes matrix data composed of elements of k rows×m columns, and the reference symbol W denotes matrix data composed of elements of m rows×n columns. Elements of the matrix data In correspond to input data inputted to the parallel arithmetic circuit 3 (for example, 3_0). Further, elements of the matrix data W are data stored in the local memory 14 in the parallel arithmetic circuit 3_0, and corresponds to the weight data w (w') described with reference to FIG. 2. In the example of FIG. 4, multiplication is performed between the elements of the matrix data In and the elements of the matrix data W, and a bias value C is added to each element of a multiplication result, and an additional result is outputted as matrix data Out that is composed of elements of k rows x n columns. Incidentally, this bias value C is also stored in the local memory 14.

A case of executing the product-sum operation for the matrix data In related to the first layer processing will be described. First, the matrix data W and the bias value C corresponding to the matrix data In are transferred as initial values to the local memory 14. Next, data in a first row of the matrix data In is read from the external memory 13 and is supplied to the array unit 12. At this time, since the array unit 12 has a configuration and state defined by the management unit 9, the data in the first row read out is subjected to a predetermined processing determined by the configuration and state of the array unit 12 and a result that has been executing the predetermined processing is supplied as the data of the first line to the parallel arithmetic circuit 3.

In the parallel arithmetic circuit 3, the bias value C from the local memory 14 is set as initial value in the product-sum operation units 3a to 3n. Thereafter, the product-sum operation units 3a to 3n perform the product-sum operations between the first row data (result of executing the predetermined processing) supplied from the array unit 12 and the first column data of the matrix data W read from the local memory 14.

FIG. 5 shows an example of the product-sum operation when the number of columns (m) of the matrix data In is 20 and the number of columns (n) and the number of rows (m) of the matrix data W are 20, respectively. When explained with reference to the example of FIG. 5, a predetermined processing is executed by the array unit 12 with respect to first row data b0 to b19 of the matrix data In. The parallel arithmetic circuit 3 performs a product-sum operation about a result of this processing with the matrix data W. In the same manner for the second and subsequent rows of the matrix data In, the parallel arithmetic circuit 3 performs a product-sum operation with the matrix data W. Further, during a process of performing a product operation(s) in the parallel arithmetic circuit 3, a result (s) of the product operation is accumulated, and the bias value C is also added. Consequently, each element of the matrix data Out is calculated.

<<Configuration of Parallel Arithmetic Circuit 3>>

Figure 6:
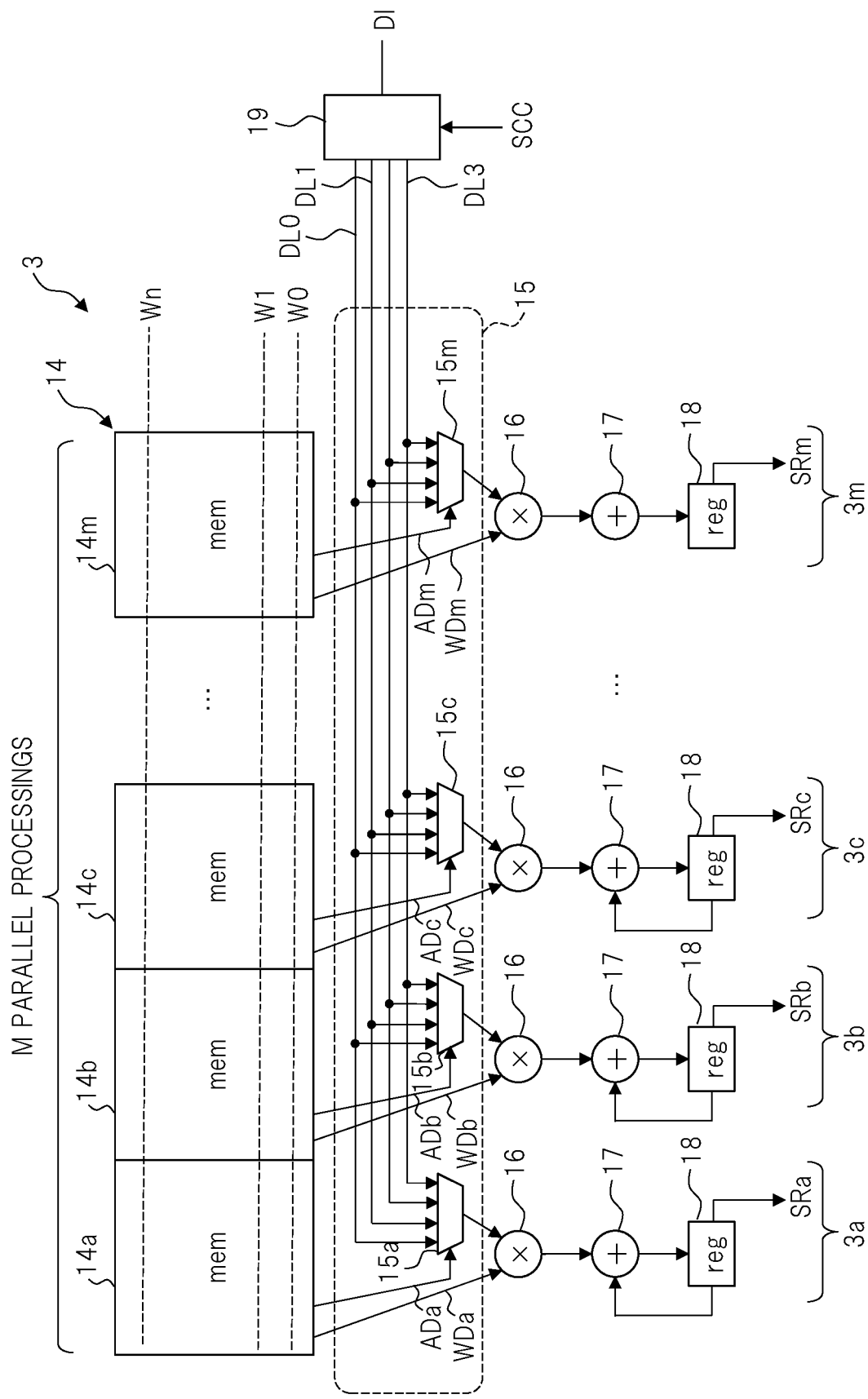
FIG. 6 is a block diagram showing a configuration of a parallel arithmetic circuit according to the first embodiment.

FIG. 6 is a block diagram showing a configuration of a parallel arithmetic circuit according to the first embodiment. The parallel arithmetic circuit 3 includes a local memory 14, product-sum arithmetic units 3a to 3m, a selector 15, and a latch circuit 19.

Input data (feature amount) DI, which is generated by the array unit 12 and to which the product-sum operation should be performed with the weight data (first data), is supplied in series to the latch circuit 19. Although not particularly limited, one piece of input data DI is composed of 16 bits in parallel. A plurality of pieces of input data DIs are sequentially supplied to the latch circuit 19 by regarding 16 bits as one unit. The latch circuit 19 outputs, as four pieces of data DL0 to DL3 (second data), a sequence of supplied input data DI in parallel based on a control signal SCC. For example, the latch circuit 19 outputs and retains: the first supplied input data DI as data DL0; the second supplied input data DI as data DL1; the third supplied data DI as data DL2; and the fourth supplied data DI as data DL3.

When the input data DI is high-bit width parallel data, the latch circuit 19 may divide the supplied high-bit parallel data into data DL0 to DL3 and output them in parallel.

When the control signal SCC changes next, the latch circuit 19 outputs and retains: the fifth input data DI as data DL0; the sixth supplied input data DI as data DL1; the seventh supplied data as data DL2; and the eighth supplied data DI as data DL3. In the same manner thereafter, each time the control signal SCC changes, the latch circuit 19 outputs and retains in parallel the four pieces of input data DI sequentially supplied. In other words, the latch circuit 19 is a conversion circuit that converts a serial data sequence into parallel data.

Of course, the latch circuit 19 is not limited to this. For example, the number of pieces of data to be outputted in parallel is not limited to four, and may be two or more.

The selector 15 is connected to the local memory 14, the latch circuit 19, and the product-sum operation units 3a to 3m. The selector 15 includes unit selectors 15a to 15m corresponding to the product-sum operation units 3a to 3m, respectively. The three pieces of data DL0 to DL3 are commonly supplied from the latch circuit 19 to the unit selectors 15a to 15m. Each of the unit selectors 15a to 15m selects, from the data DL0 to DL3, the data specified by additional information (described later) ADa to ADm supplied from the local memory 14, and supplies the selected data to the corresponding product-sum operation unit.

The local memory 14 is composed of one memory, but its output is divided so as to correspond to the product-sum operation units 3a to 3m. In order to show that the output is divided into a plurality of parts, the local memory 14 is drawn so as to be configured by unit local memories 14a to 14m in the same figure. However, since the local memory 14 is composed of one memory, words W0 to Wn are common to the unit local memories 14a to 14m. Therefore, for example, when the word W0 is selected, corresponding weight data WDa to WDm are simultaneously read from the unit local memories 14a to 14m. Here, an example in which the local memory 14 is configured by one memory will be described, but the present invention is not limited to this and the local memory 14 may be configured by a plurality of memories. However, in this case, since a configuration for managing an address of each memory is required, it is desirable to configure the local memory 14 with one memory.

Further, the additional information ADa to ADm is stored in the unit local memories 14a to 14m, and when the weight data WDa to WDm are read, the additional information ADa to ADm are also read at the same time.

In the first embodiment, the product-sum operation unit, the unit selector, and the unit local memory have a one-to-one correspondence. For example, the product-sum operation unit 3a, the unit selector 15a, and the unit local memory 14a correspond to one another. The additional information ADa read from the unit local memory 14a is supplied to the corresponding unit selector 15a. According to the additional information ADa, the data selected by the unit selector 15a from the data DL1 to DL4 and the weight data WDa read from the unit local memory 14a are supplied to the product-sum operation unit 3a. Incidentally, although not particularly limited, the weight data WDa is also data in units of 16 bits.

The product-sum operation unit 3a includes a multiplier (product operation unit) 16, an adder 17, and a register 18. The data selected by the unit selector 15a and the weight data WDa are supplied to the product operation unit 16, and the product operation is executed between these pieces of data. A product operation result calculated by the product operation unit 16 is added by the adder 17 to the data stored in the register 18, and its addition result is stored in the register 18. The data stored in the register 18 is outputted as a product-sum operation result SRa. As an initial value, a numerical value 0 or a bias value C described with reference to FIG. 4 is supplied to the register 18 from the corresponding unit local memory 14a.

The product-sum operation unit 3a, and the corresponding unit selector 15a and unit local memory 14a have been described as examples, but the same applies also to the remaining product-sum operation units 3b to 3m, the unit selectors 15b to 15m, and the unit local memories 14b to 14m.

<<Operation of Parallel Arithmetic Circuit>>
<<<Principle>>>

Figure 7:
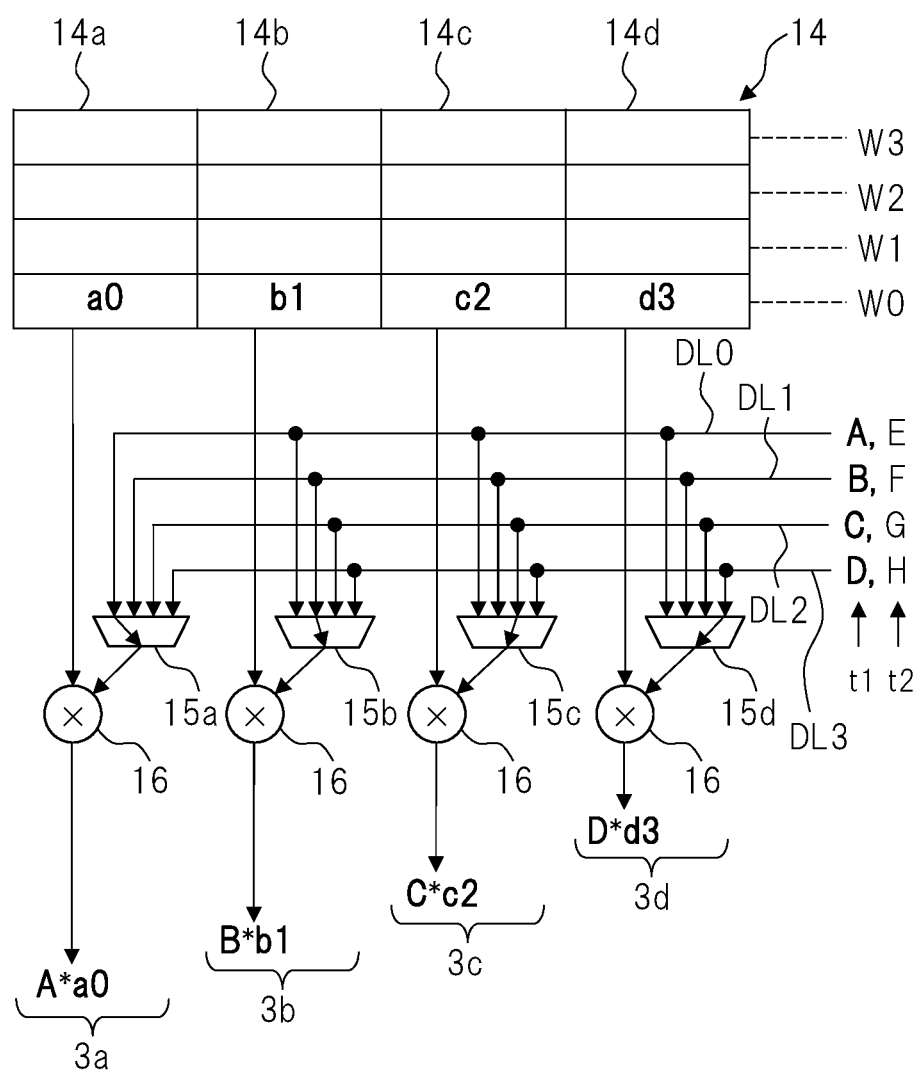
FIG. 7 is a diagram for explaining the principle of the parallel arithmetic circuit according to the first embodiment.

First, the principle of the parallel arithmetic circuit according to the first embodiment will be described with reference to the drawings. FIG. 7 is a diagram for explaining the principle of the parallel arithmetic circuit according to the first embodiment. FIG. 7 shows, in the parallel arithmetic circuit 3 shown in FIG. 6, four unit local memories 14a to 14d, unit selectors 15a to 15d corresponding to these unit local memories, and product-sum operation units 3a to 3d. Incidentally, as the product-sum operation units 3a to 3d, only the product-sum operation unit 16 is shown in FIG. 7.

In the product-sum operation executed by the parallel arithmetic circuit 3, the weight data serving as a multiplication coefficient is stored in the local memory 14, but the weight data may include data corresponding to the numerical value 0. Even if the product-sum operation is executed by using the weight data corresponding to the numerical value 0, the product-sum operation result does not change.

In the first embodiment, a processing of compressing the weight data is performed before the weight data is stored in the local memory 14. That is, in the first embodiment, the weight data corresponding to the numerical value 0 is omitted, and the weight data compressed by the omission is stored in the local memory 14. Consequently, as shown in FIG. 7, weight data a0, b1, c2, and d3, which are not the numerical value 0, are stored in the lowermost lines of the unit local memories 14a to 14d. Further, the latch circuit 19 (FIG. 6) outputs data A to D as input data DL0 to DL3 at time t1, and outputs data E to H as input data DL0 to DL3 at time t2.

At the time t1, the unit selectors 15a to 15d select the data A to D according to the additional information ADa to ADd supplied to the unit selectors 15a to 15d, as shown in FIG. 7. That is, the unit selector 15a selects data A, the unit selector 15b selects data B, the unit selector 15c selects data C, and the unit selector 15d selects data D. Further, by selecting the word W0 (FIG. 6) at the time t1, the weight data a0, b1, c2, and d3 are read from the unit local memories 14a to 14d. Consequently, the product operation unit 16 in the product-sum operation units 3a to 3d simultaneously executes the product operation between the weight data a0, b1, c2, d3 and the data A to D, and product operation results A*a0, B*b1, C*c2, and D*d3 are outputted.

Subsequently, when the word W1 is selected, the next weight data can be read from the unit local memories 14a to 14d, whereas the data A to D are retained by the latch circuit 19 and can be continuously used. Consequently, the product operation unit 16 in the product-sum operation units 3a to 3d executes the product operation in parallel between the next weight data and the data A to D. As a result, the product-sum operation results for the data A to D based on the two pieces of weight data are outputted in parallel from the product-sum operation units 3a to 3d.

At the time t2, the input data DL0 to DL3 outputted from the latch circuit 19 are changed to data E to H. In this case as well, the product-sum operation result of the changed input data and the weight data is outputted from the product-sum operation units 3a to 3d similarly to a case of time t1.

<<<Compression Method (Data Generation Method)>>>

Figure 8:
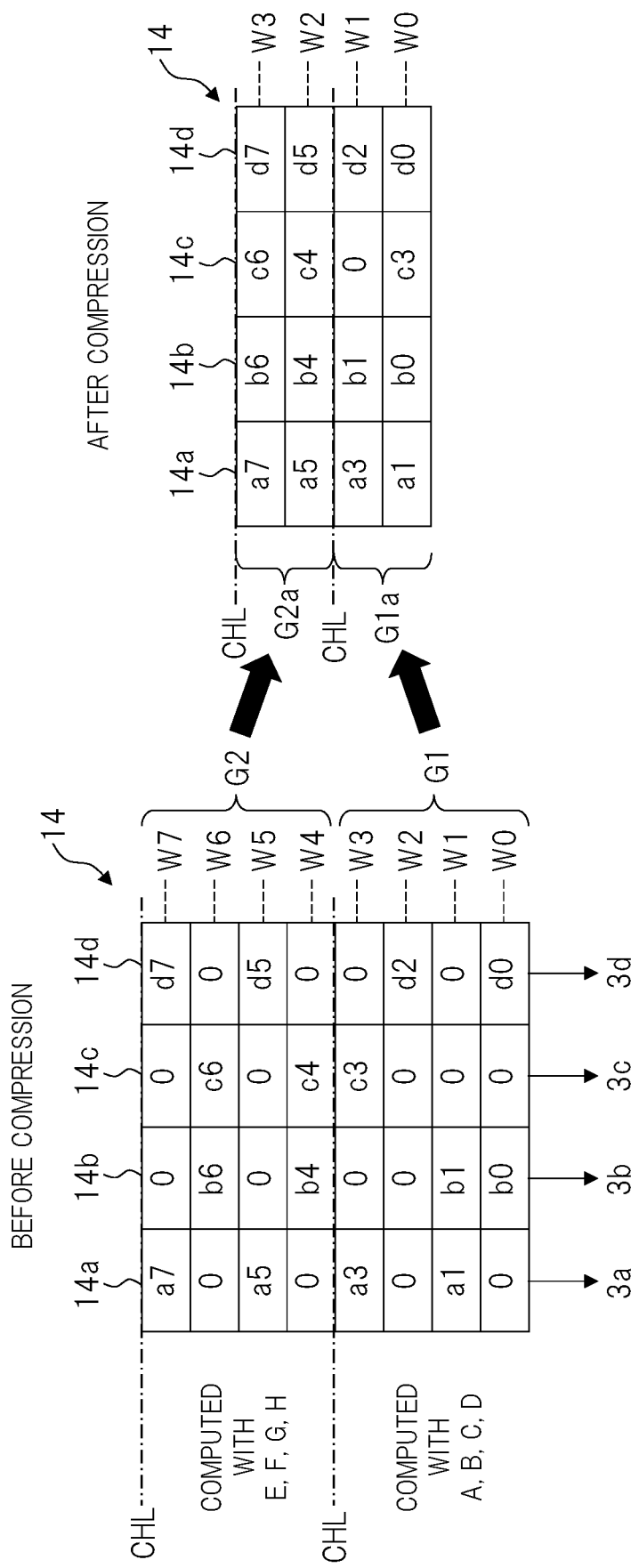
FIG. 8 is a diagram for explaining a compressing method according to the first embodiment.

Next, a compression method of compressing weight data will be described by using the drawings. Compressing the weight data makes it possible to compress a consumed amount of local memory 14 and shorten a processing time. FIG. 8 is a diagram for explaining the compression method according to the first embodiment. FIG. 8 shows a before-compression state (before compression) and an after-compression state (after compression) based on the compression method according to the first embodiment. Here, a case where the weight data (original data) in the local memory 14 is arranged in a matrix will be described as an example. Each of the local memories 14a to 14d constitutes a column of a matrix. Further, it is assumed that eight words in the unit local memory are W0 to W7. Consequently, as shown by the before-compression state, a matrix of 8 rows and 4 columns is formed. In the matrix, 32 pieces of weight data including the data corresponding to the numerical value 0 are arranged. Also here, it is assumed that each piece of weight data is composed of 16 bits.

In the compression method according to the first embodiment, the data corresponding to the numerical value 0 among the pieces of data arranged in the matrix is omitted so as to be reduced in an omitting step. In the matrix after the omission, the data arranged on an upper side in the same column is moved to a portion that becomes blank due to the omission, and the blank portion is filled (compression step). That is, the data arranged on the upper side is moved toward the lowermost line and the data is filled on a lowermost line side so that the blank portion due to the omission disappears.

Explanation made by using a column corresponding to the unit local memory 14a as an example is as follows. First, the data corresponding to the numerical value 0 is arranged in words W0, W2, W4 and W6 (before compression). By omitting these pieces of data, portions corresponding to the words W0, W2, W4 and W6 are blank. The data arranged on an upper side in the same column is moved so that these blank portions are filled with pieces of data other than the numerical value 0. That is, the data a1 is moved to the word W0. Consequently, the words W1 and W2 become blank, so that the data a3 arranged in the word W3 is moved to the word W1. Thus, the words W2 to W4 become blank, so the data a5 arranged in the word W5 is moved to the word W2. Finally, the data a7 arranged in the word W7 is moved to the word W3 that has been blank. Similarly for the remaining unit local memories 14b to 14d, by moving the data, 32 pieces of weight data are arranged in 4 rows and 4 columns as shown by the after-compression state.

Further, the matrix before the compression is divided into two groups G1 and G2. In the first embodiment, the data supplied to the unit selector is changed according to the group. That is, in the group G1, the data A to D are supplied as the input data DL0 to DL3 to be operands with the weight data. In contrast, in the group G2, the data E to H are supplied as the input data DL0 to DL3 to be expands with the weight data. A position of a boundary line (dashed line) CHL between the groups G1 and G2 is determined by the number of pieces of input data inputted to the parallel arithmetic circuit. In the example of FIG. 7, since the input data is in units of four (A to D and E to H), the four rows are divided as one group.

After the compression, the group G1 becomes a group G1a with two rows, and group G2 also becomes a group G2a with two rows. The groups G1, G2 and the groups G1a, G2a can be regarded as two matrices arranged with the boundary line CHL as a boundary.

When each group is compressed toward the lowermost row, the data is prevented from moving downward across the groups. For example, if the unit local memory 14c is taken as an example, the data c4 arranged in the word W4 before the compression can be moved to the word W1 by the compression. However, when the data c4 is moved to the word W1, the data c4 after the compression is moved to the group G1a and is calculated with any of the data A to D. As a result, the data c4 may be calculated with erroneous input data. In the first embodiment, the data corresponding to the numerical value 0 is added to a portion of the word W1 in the unit local memory 14c of the group G1a. Consequently, the data c4 after the compression is arranged in the group G2a without crossing the boundary line CHL, and is calculated with any of the data E to H.

From a different point of view, the present embodiment performs the compression for omitting the data corresponding to the numerical value 0 in units of the groups G1a, G2a before the compression, which can be considered as generation of the groups G1a, G2a after the compression.

<<<Additional Information (First Additional Information)>>>

Before the compression, the row Wn of the weight in the memory 14 indicates which piece of input data each weight is calculated with. Here, if the data corresponding to the numerical value 0 is omitted from the weight data for the compression, a position of the weight data in the matrix after the compression changes. Thus, the correspondence between the weight data after the compression and the input data of its operand becomes unclear. In the first embodiment, information indicating which piece of input data the weight data after the compression is calculated with is generated and added as additional information in an additional information generation step. Incidentally, in the following description, this additional information is also referred to as first additional information.

Figure 9:
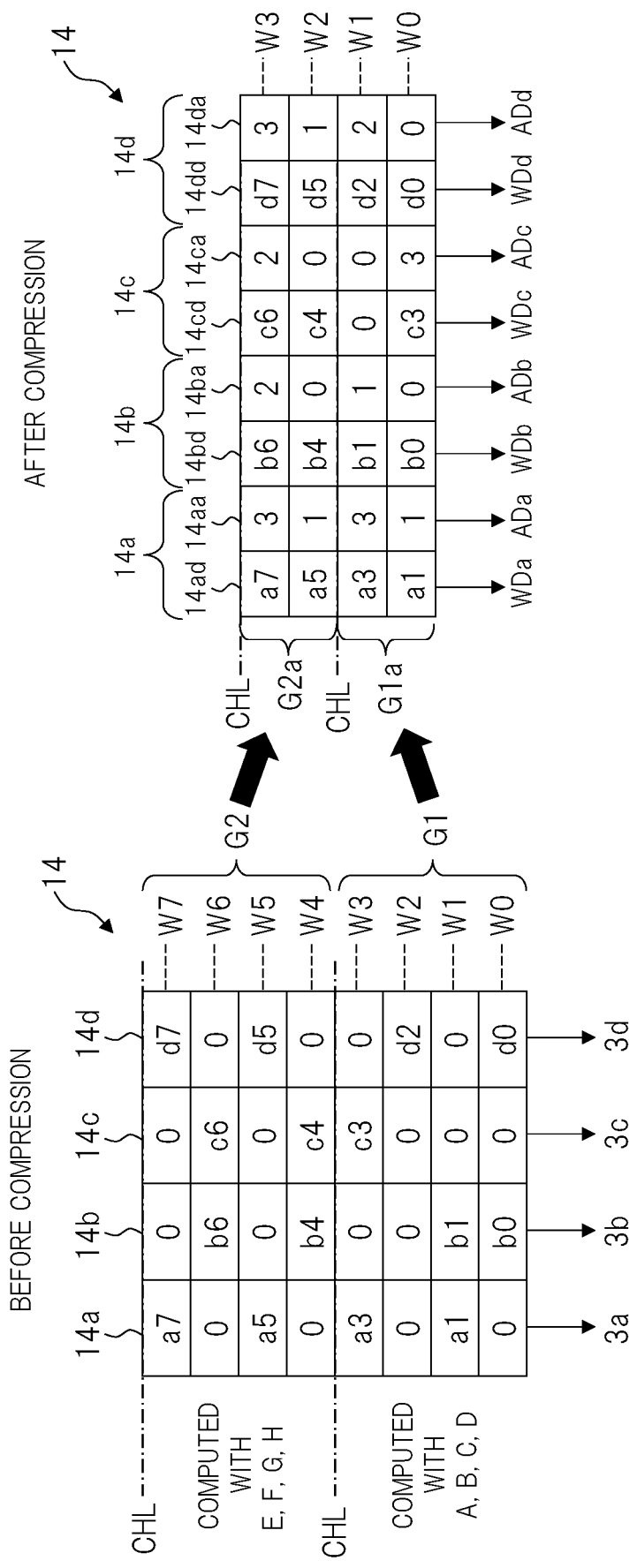
FIG. 9 is a diagram for explaining the parallel arithmetic circuit according to the first embodiment.

Next, the first additional information will be described with reference to the figure. FIG. 9 is a diagram for explaining a parallel arithmetic circuit according to the first embodiment.

The matrix before the compression and shown in FIG. 9 is the same as the matrix before the compression and shown in FIG. 8. In the matrix after the compressed and shown in FIG. 9, the compressed weight data and the corresponding first additional information are arranged. In FIG. 9, each of the unit local memories 14a to 14d has two storage sequences, one storage sequence (data storage sequence) storing the weight data, and the other storage sequence (additional storage sequence) storing the first additional information. If the unit local memory 14a is taken as an example, the one storage sequence is denoted by the reference numeral 14a d, and the other storage sequence is denoted by the reference numeral 14aa.

In the matrix before the compression, the weight data corresponding to the numerical value 0 is omitted from the weight data 0, a1, 0, a3, 0, a5, 0, a7 arranged in the column (unit local memory 14a). In this case, the operand of the weight data 0 arranged in the lowermost word W0 is the input data DL0 (FIG. 7). The operand of the weight data a1 arranged in the next word W1 is the input data DL1, and the operand of the weight data 0 arranged in the word W2 is the input data DL2. Further, the operand of the weight data a3 arranged in the word W3 is the input data DL3. The weight data corresponding to the numerical value 0 is omitted, the remaining weight data is stored in the data storage sequence 14*ad*, and the first additional information corresponding to the remaining weight data is stored in the additional storage sequence 14*aa*.

Before the compression, the operands of the weight data 0, a1, 0, a3 arranged in the words W0 to W3 are the input data DL0, DL1, DL2, DL3, and position information of the input data DL0 to DL3 is the first additional information. Here, the numbers 0 to 3 denoted to the reference numeral DL correspond to positions of the four pieces of input data. Specifically, the operand of the weight data a1 in the word W1 before the compression is the input data DL1, and the position information is 1. Further, the operand of the weight data a3 in the word W3 before the compression is the input data DL3, and the position information is 3. In the additional storage sequence 14*aa* after the compression, the position information 1 corresponding to the weight data a1 is stored in the portion of the word W0. Similarly, in the additional storage sequence 14*aa* after the compression, the position information 3 corresponding to the weight data a3 is stored in the portion of the word W1. Consequently, the correspondence between the weight data after the compression and the input data to be the operand is defined. As a result, after the compression, for example, when the word W0 is selected, the data a0 is read out as weight data WDa from the data storage sequence 14*ad* and the numerical value 1 indicating a position is read as additional information ADa from the additional storage sequence 14*aa*.

Although the unit local memory 14*a* has been described as an example, the same applies to the remaining unit local memories 14*b* to 14*d*.

Here, the explanation has been given by taking the groups G1, G1*a* as examples, but the same applies to the groups G2, G2*a*. In the case of the groups G2, G2*a*, the words W4 to W7 before the compression and the words W2 to W3 after the compression may be read as the words W0 to W3 and the words W0 to W1 described above.

Figure 10:
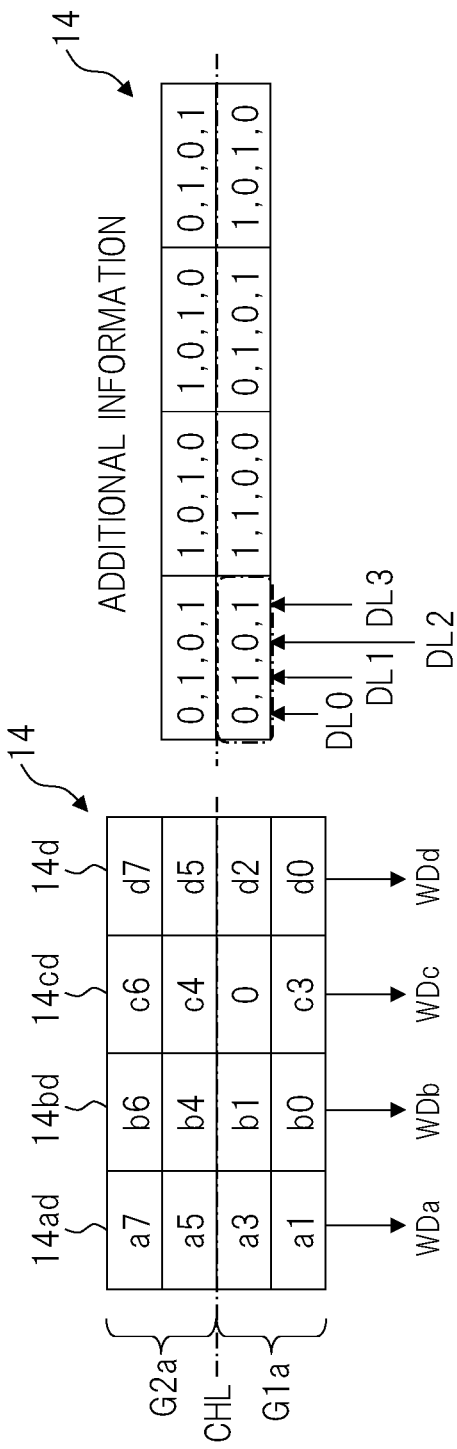
FIG. 10 is a diagram for explaining the parallel arithmetic circuit according to the first embodiment.

FIG. 9 shows an example in which a decimal system indicating a position is used as additional information, but the present invention is not limited to this. For example, the additional information may be represented in a binary system (bitmap format) as shown in FIG. 10 instead of the decimal system. In FIG. 10, in the group G1 before the compression, the binary numbers "0, 1, 0, 1" indicating that the data a1 and a3 arranged in the unit local memory 14*a* are second and fourth are stored as additional information in the unit local memory 14*a*. In this case, a first bit of the binary system indicates the first input data DL0; the next second bit indicates the second input data DL1; the next third bit indicates the third input DL2; and the last fourth bit shows the fourth input data DL3. In order to indicate that the second and fourth input data DL1 and DL3 are the operands, the second and fourth bits have a logical value of "1", and the input data DL0 and DL2 are not the operands, so that the first bit and the third bit have logical values of "0". Since the additional information can be represented by four bits, memory capacity required to represent the additional information can be reduced.

<<<Additional Information on Timing (Second Additional Information)>>>

Figure 11:
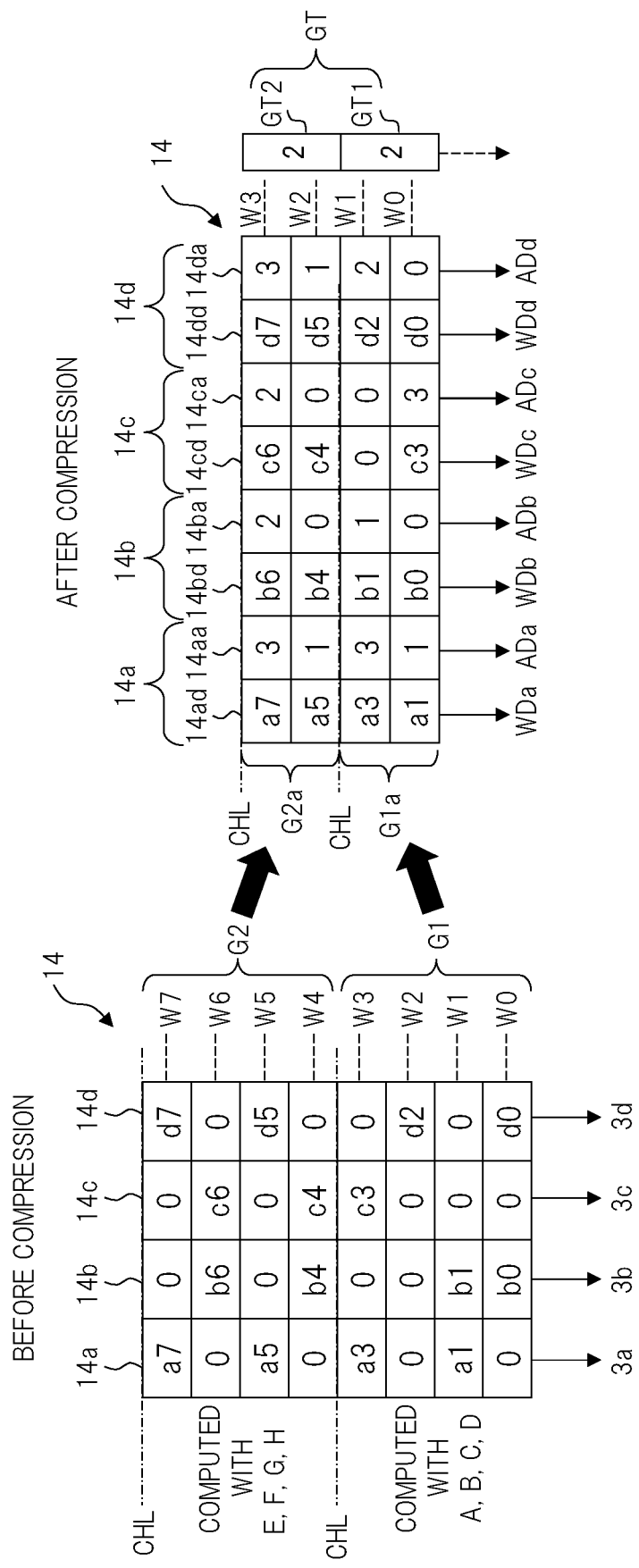
FIG. 11 is a diagram for explaining the parallel arithmetic circuit according to the first embodiment.

When the pieces of weight data of a plurality of rows are read and used while the input data DL0 to DL3 is maintained, timing of holding the input data requires being controlled by the latch circuit 19 (FIG. 6) in order to perform the compression. In the first embodiment, this timing is controlled by the additional information (hereinafter, also referred to as second additional information). The second additional information will be described with reference to the drawings. FIG. 11 is a diagram for explaining a parallel arithmetic circuit according to the first embodiment.

The matrix before the compression and the matrix after the compression as shown in FIG. 11 are the same as those shown in FIG. 9. FIG. 11 shows a register GT used to generate a control signal SCC supplied to the latch circuit 19.

Each of the groups G1 and G2 in the matrix before the compression has four rows. Therefore, by holding the values of the input data DL0 to DL3 for four cycles, the product-sum operation can be executed while the weight data is changed with the data A to D being maintained as the input data DL0 to DL3. However, by executing the compression processing, the number of rows in each of the groups G1*a* and G2*a* after the compression is less than that before the compression, and becomes two rows.

In the first embodiment, the register GT includes a plurality of register units GT1 and GT2 corresponding to the group after the compression. The number of rows of the corresponding groups G1*a* and G2*a* is set in the register unit GT1 corresponding to the group G1*a* and the register unit GT2 corresponding to the group G2*a*, respectively. Consequently, the control signal SCC maintains the outputted input data DL0 to DL3 for the number of cycles set in the register unit GT1. As a result, the product-sum operation units 3*a* to 3*d* execute the product-sum operation between the weight data sequentially supplied from the group G1*a* and the input data DL0 to DL3 (that is, the data A to D) for two cycles. Further, after two cycles, the product-sum operation units 3*a* to 3*d* execute the product-sum operation between the weight data from the group G2*a* and the input data DL0 to DL3 (that is, the data E to H). The number of cycles or a period (GT1: first period, GT2: second period) for outputting the same input data is considered to be set in the register units GT1 and GT2.

<<Operation of Parallel Arithmetic Circuit>>

Next, an operation example of the parallel arithmetic circuit 3 will be described with reference to the drawings. FIGS. 12 to 15 are state diagrams each showing an operation of the parallel arithmetic circuit according to the first embodiment.

In FIGS. 12 to 15, the reference numeral 14 denotes a local memory after the compression. In these drawings, the weight data stored in the local memory 14 is the same as that of the local memory after the compression and shown in FIG. 8.

Figure 12:
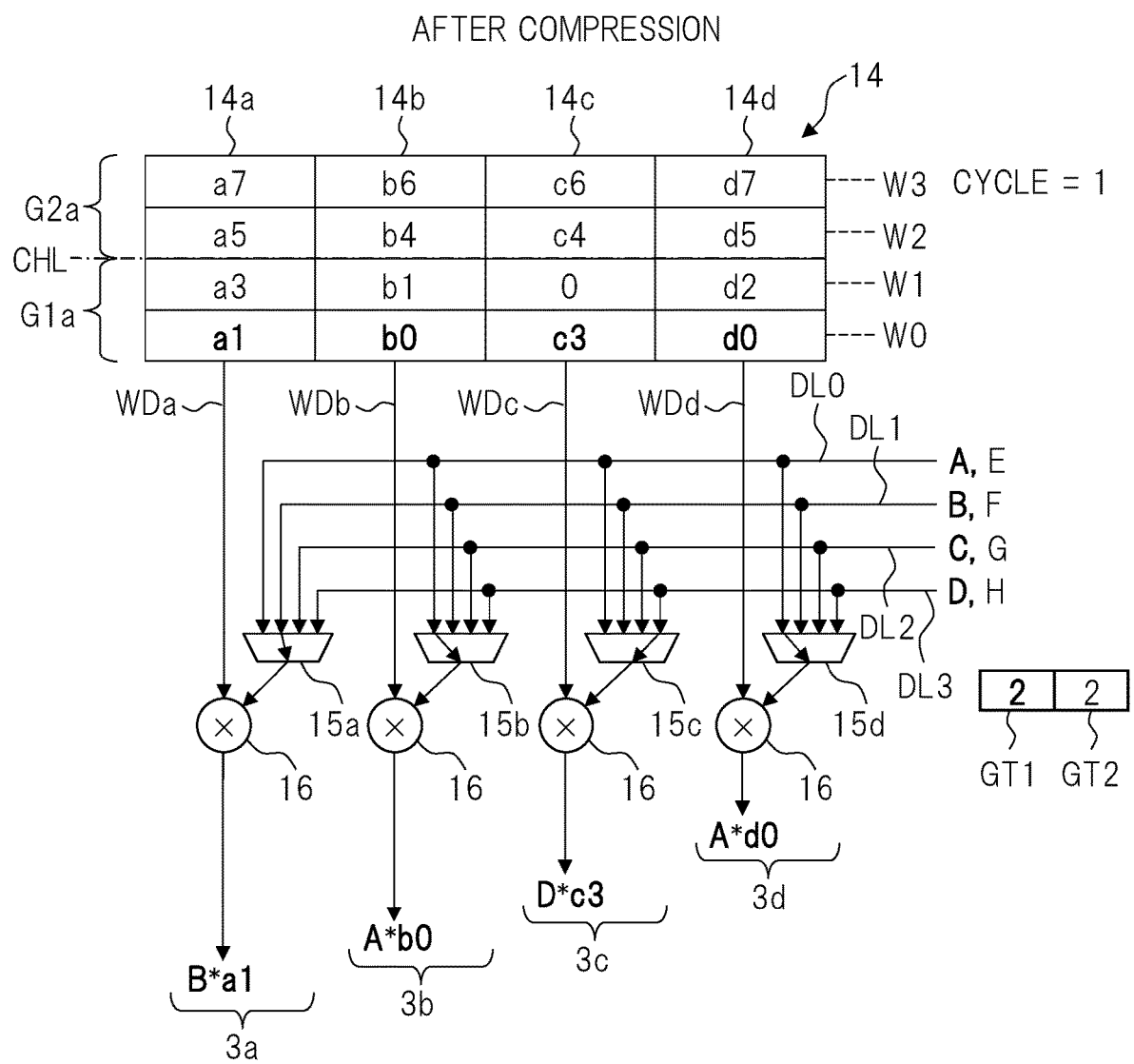
FIG. 12 is a state diagram showing an operation of the parallel arithmetic circuit according to the first embodiment.

FIG. 12 shows a state of the product-sum operation in a first cycle. Since the register unit GT1 is 2, the data A to D are supplied as input data DL0 to DL3 in parallel to the unit selectors 15*a* to 15*d* during two cycles. The first additional information ADa to ADd described with reference to FIG. 9 is supplied to the unit selectors 15*a* to 15*d*. Consequently, since the additional information ADa is 1, the unit selector 15*a* selects the data B which is the input data DL1 corresponding to the position 1. Further, the unit selector 15*b* selects the data A which is the input data DL0 corresponding to the position 0, and the unit selector 15*c* selects the data D which is the input data DL3 corresponding to the position 3. Moreover, the unit selector 15*d* selects the data A which is the input data DL0 corresponding to the position 0. As a result, the product-sum operation unit 16 outputs the product operation results B*a1, A*b0, D*c3, and A*d0 in parallel, as shown in FIG. 12.

Figure 13:
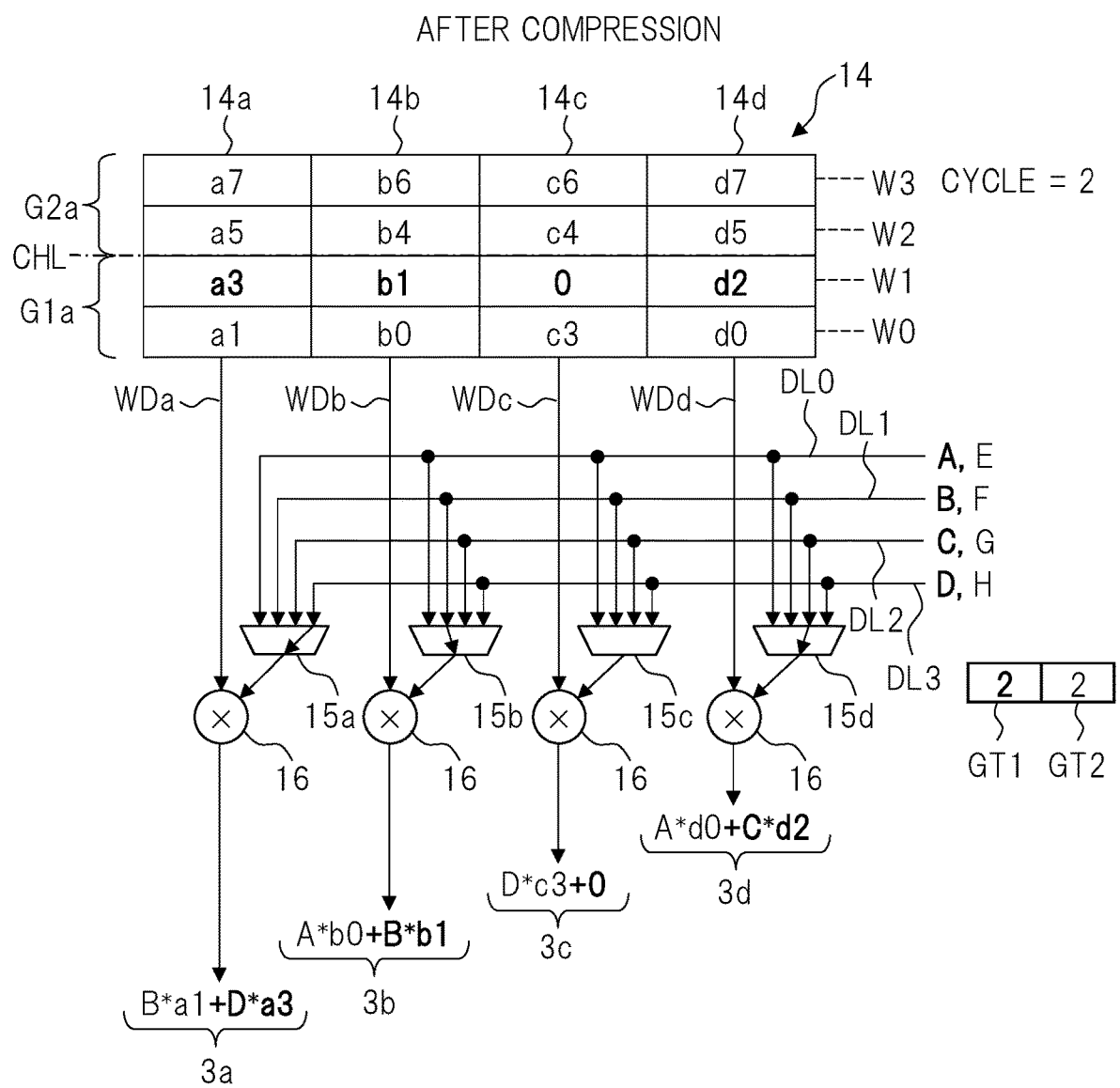
FIG. 13 is a diagram for explaining the parallel arithmetic circuit according to the first embodiment.

When the first cycle is completed and the second cycle is started, the state of the parallel arithmetic circuit 3 changes as shown in FIG. 13.

That is, the word W1 is selected. Further, since the register unit GT1 is 2, the data A to D are maintained as the input data DL0 to DL3. When the word W2 is selected, the unit selectors 15a to 15d select the input data DL3 (data D), the input data DL1 (data B), the input data DL0 (data A), and the input data DL2 (data C) according to the first additional information shown in FIG. 9. As a result, the product-sum operation units 3a to 3d output the sum of the product operation result calculated in the first cycle and the product operation calculated in the second cycle, as shown in FIG. 13.

Figure 14:
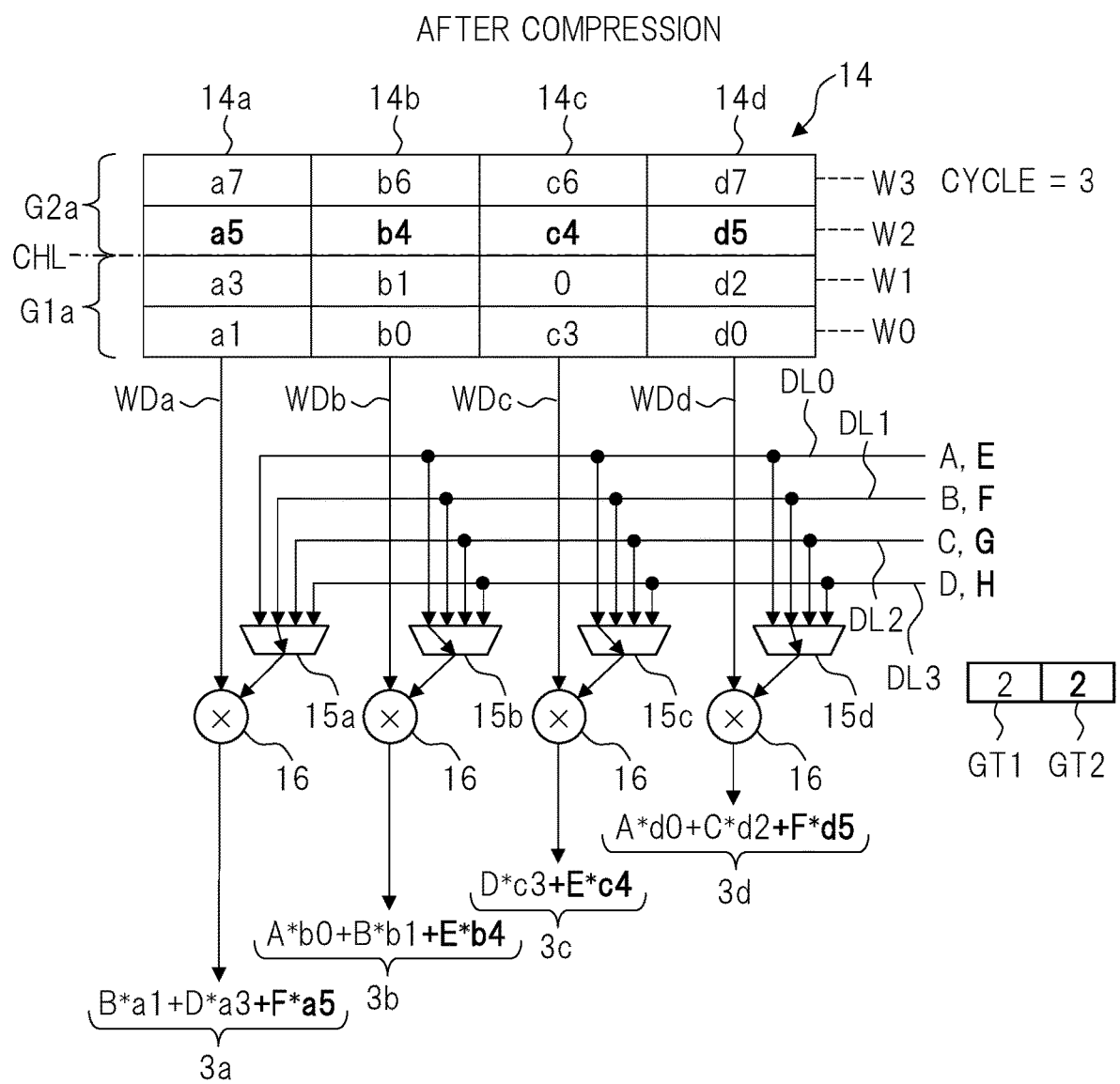
FIG. 14 is a diagram for explaining the parallel arithmetic circuit according to the first embodiment.

When the second cycle is completed and the third cycle is started, the state of the parallel arithmetic circuit 3 changes as shown in FIG. 14.

That is, the word W2 is selected. Further, since the two cycles indicated by GT1 have been completed, the next GT2 is selected and its value is 2, so that the latch circuit 19 outputs the data E to H as the input data DL0 to DL3. When the word W2 is selected, the unit selectors 15a to 15d select the input data DL1 (data F), the input data DL0 (data E), the input data DL0 (data E), and the input data DL1 (data F) according to the first additional information shown in FIG. 9. As a result, the product-sum operation units 3a to 3d output the sum of the product-sum operation calculated in the third cycle to the result of the product-sum operation calculated in the second cycle, as shown in FIG. 14.

Figure 15:
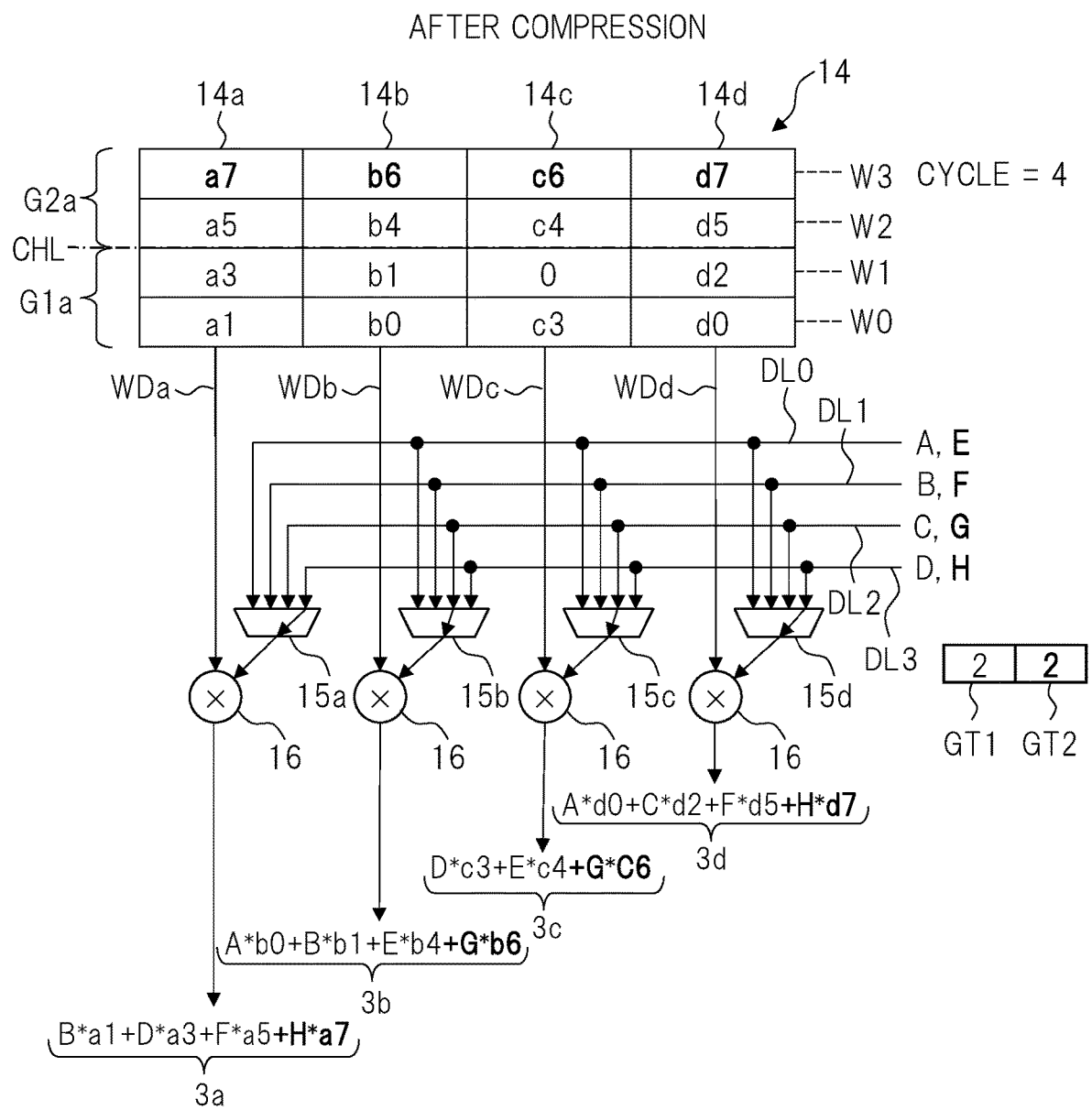
FIG. 15 is a diagram for explaining the parallel arithmetic circuit according to the first embodiment.

When the third cycle is completed and the fourth cycle is started, the state of the parallel arithmetic circuit 3 changes as shown in FIG. 15.

That is, the word W3 is selected. Further, since the value of the register unit GT2 is 2, the latch circuit 19 maintains the output of the data E to H as the input data DL0 to DL3. When the word W3 is selected, the unit selectors 15a to 15d select the input data DL3 (data H), the input data DL2 (data G), the input data DL2 (data G), and the input data DL3 (data H) according to the first additional information shown in FIG. 9. As a result, the product-sum operation units 3a to 3d output the sum of the product-sum operation result calculated in the third cycle and the product-sum operation calculated in the fourth cycle, as shown in FIG. 15.

In this way, the product-sum operation is executed between the data A to H and the weight data from the local memory 14.

<Deep Learning Processing>

Next, a deep learning processing using the semiconductor device 1 according to the first embodiment will be described. As shown in FIG. 6, the parallel arithmetic circuit 3 in the semiconductor device 1 includes a local memory 14. The weight data used in the calculation of the deep learning processing is compressed and stored in the local memory 14. In addition, the above-mentioned additional information is also stored in the local memory 14. In the first embodiment, the compression of the weight data and the generation of the additional information are performed in advance on a device (for example, a computer) different from the semiconductor device 1 or on a cloud.

Figure 16:
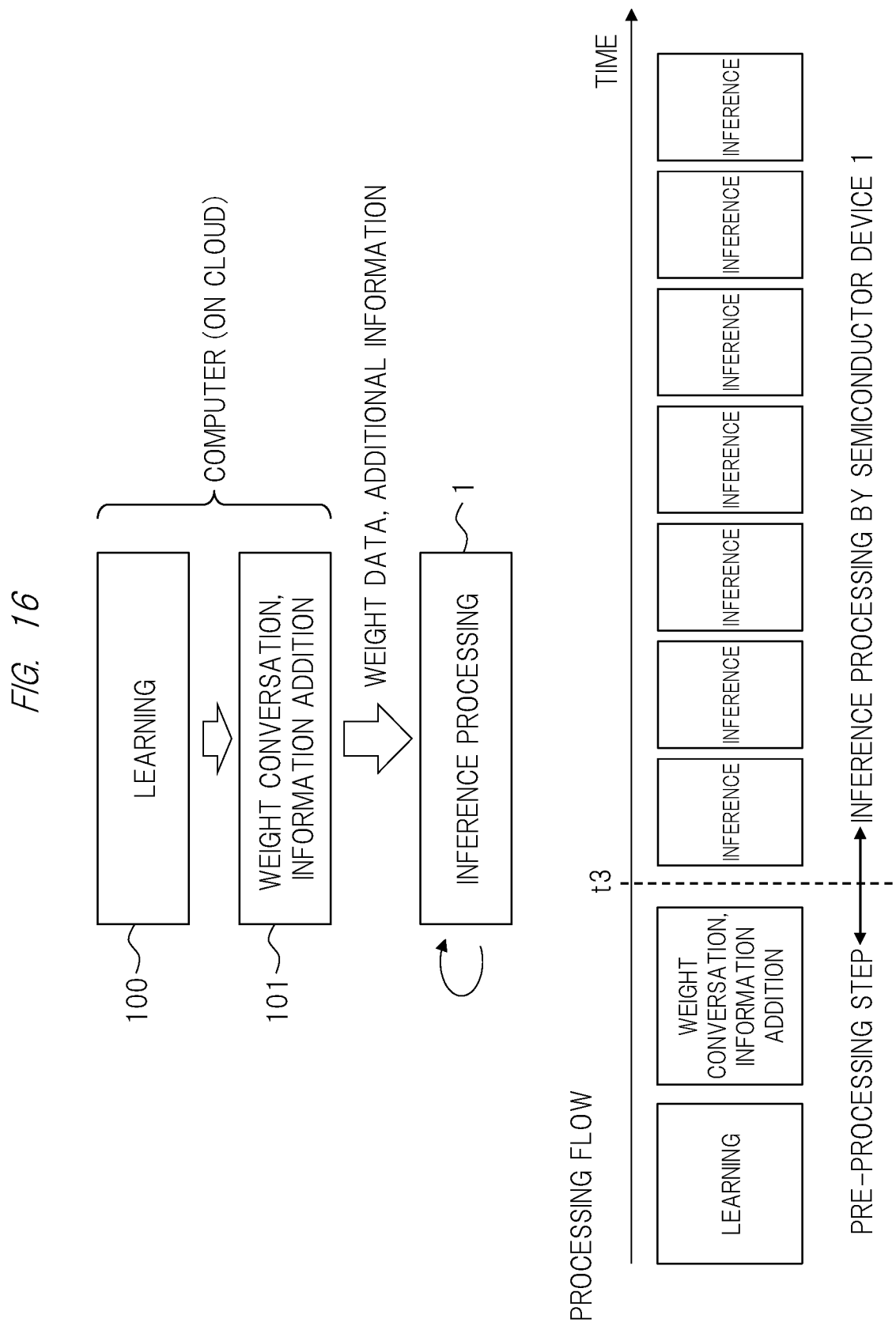
FIG. 16 is a diagram showing the entire flow of a deep learning processing according to the first embodiment.

FIG. 16 is a diagram showing an overall flow of the deep learning processing according to the first embodiment. In FIG. 16, the reference numeral 100 denotes a learning step, and the reference numeral 101 denotes a processing step of a weight conversion for compressing weight data and of generating additional information. The learning step 100 and the processing step 101 are performed in advance on a computer or the cloud. That is, in the learning step 100 on the computer or the cloud, original data that is a basis of the weight data is generated, and this original data is provided as the weight data to the processing step 101 on the computer or the cloud. The compressed weight data and additional information generated in this previous processing step (pre-processing step) are pre-transferred to the local memory 14 of the semiconductor device 1. In the semiconductor device 1, an inference processing is performed by performing an arithmetic processing between the compressed weight data stored in the local memory 14 and the input data. Although not particularly limited, the first embodiment performs a learning for a sparse model in the learning step 100. Incidentally, when the capacity of the local memory 14 is small, the compressed weight data and additional information generated in the previous processing step may be transferred to not the local memory 14 but an external memory connected to the bus B_W shown in FIG. 1.

Incidentally, a part of a processing(s) performed in the pre-processing step may be performed not on the computer or the cloud but in the semiconductor device 1.

In FIG. 16, a processing flow shows a processing(s) performed with the passage of time. The pre-processing step is performed at a time before time t3. The compressed weight data and additional information generated in the pre-processing step are transferred to the local memory 14 by a transfer path unit 11 shown in FIG. 1 and are stored therein. After time t3, the arithmetic processing is performed between the compressed weight data stored in the local memory 14 of the semiconductor device 1 and the input data, and the inference is repeated.

First Modification Example

Figure 17:
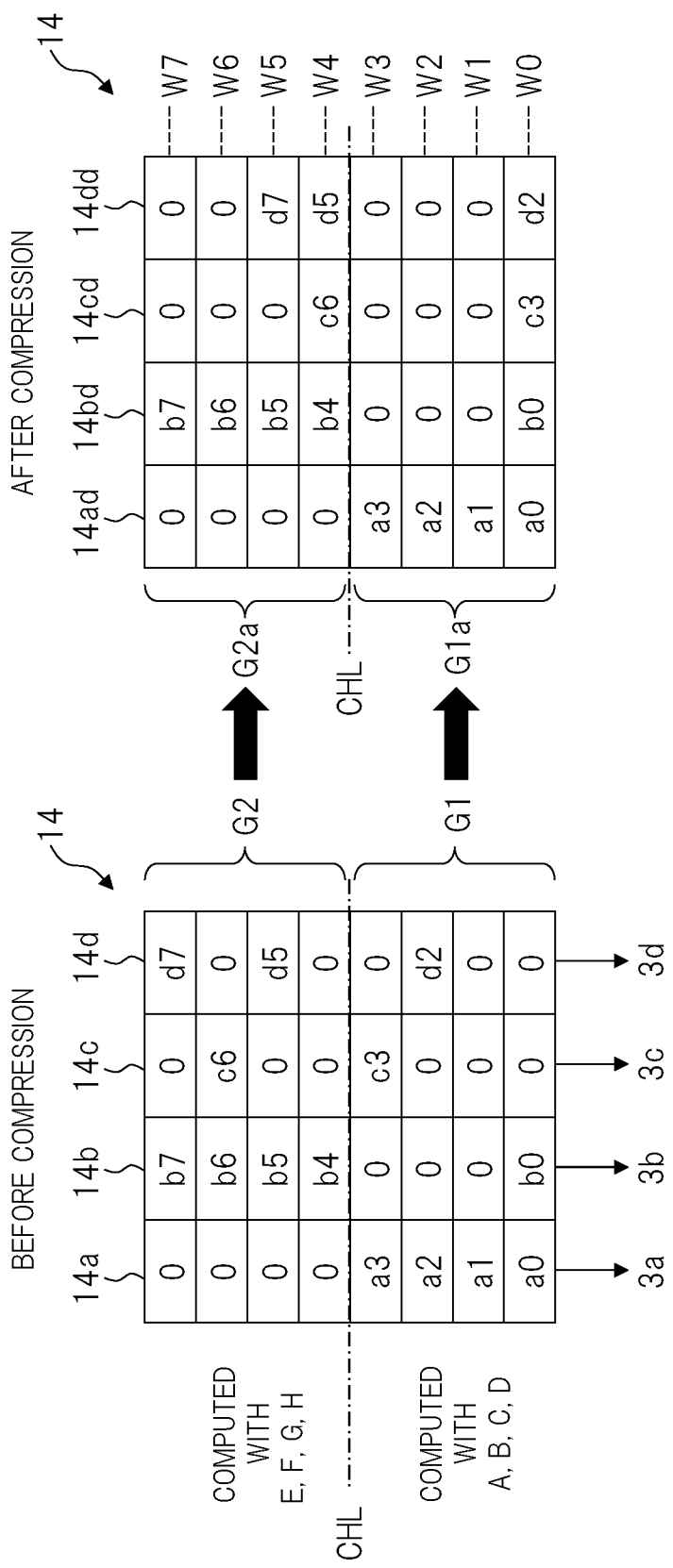
FIG. 17 is a diagram for explaining compression examined by the inventors of the present invention.

In FIG. 8, an example of compressing the weight data by omitting the data corresponding to the numerical value 0 is shown, but this may make an effect of reducing the processing time by the compression small. An example in which the effect of reducing the processing time is small will be described with reference to the drawings. FIG. 17 is a diagram for explaining the compression examined by the inventor(s) of the present invention.

Figure 18:
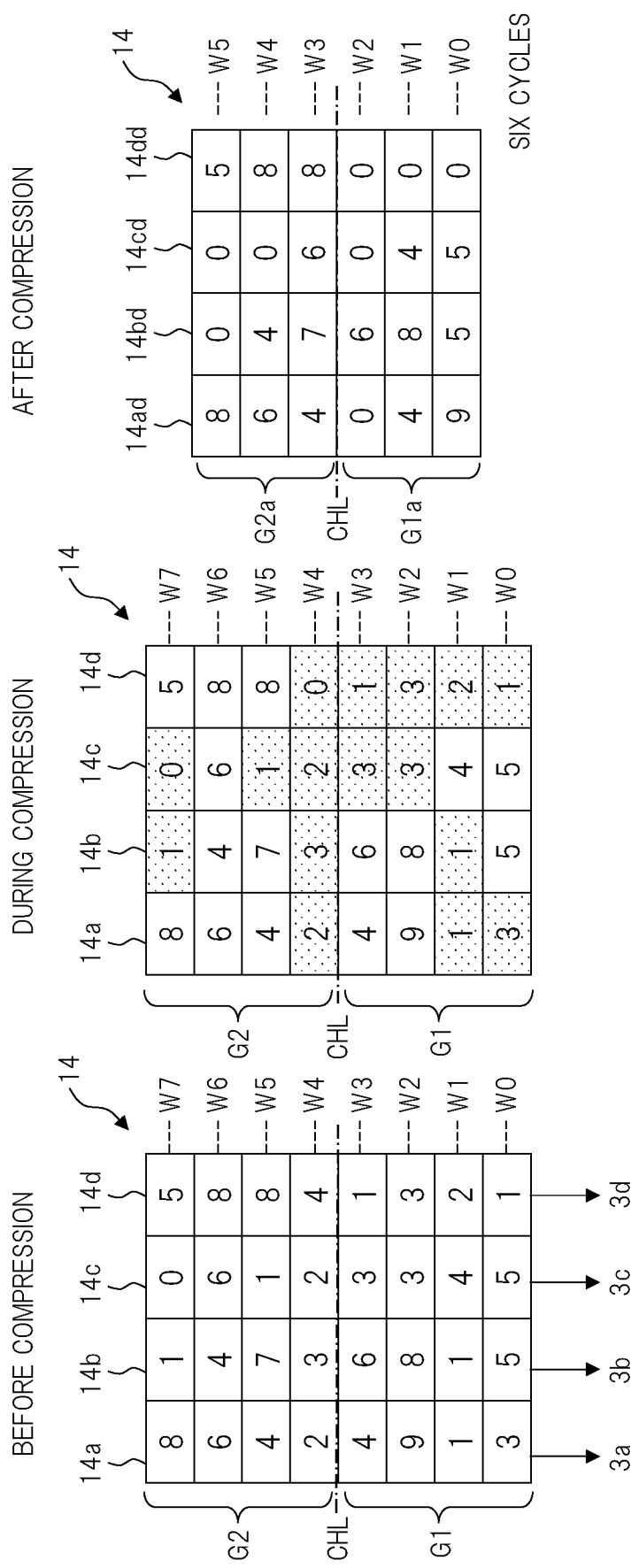
FIG. 18 is a view showing a compressing method according to a first modification example of the first embodiment.

FIG. 17 is similar to FIG. 18. A difference therebetween is that the number of pieces of weight data corresponding to the numerical value 0 arranged in the column (unit local memory) is not uniform before the compression. For example, before the compression, 0 (zero) piece of weight data corresponding to the numerical value 0 is arranged in the unit local memory 14a of the group G1. In contrast, three pieces of weight data corresponding to three numerical values 0 are arranged in the unit local memories 14b to 14d. When the data corresponding to the numerical value 0 is omitted by the compression, the significant weight data is arranged only in the part of the word W0 for the unit local memories 14b to 14c as shown after the compression, but the significant weight data is arranged in each of the words W0 to W3 for the unit local memory 14a. As a result, the product-sum operation requires selecting the words W0 to W3, needs four cycles for calculating the group G1, and cannot obtain the effect of reducing the processing time.

FIG. 18 is a diagram showing a compression method according to the first modification example. In FIG. 18, the weight data before the compression is one piece of data corresponding to the numerical value 0. Therefore, as shown in FIG. 8, even if the data corresponding to the numerical value 0 is omitted, eight cycles are required to perform the calculation.

In the first modification example, a numerical value (threshold value) smaller than a predetermined value is regarded as a numerical value 0. Consequently, pieces of data corresponding to values smaller than the predetermined value will be omitted. When the product operation is performed, the small numerical values have little influence on the result of the product-sum operation, so that even if such smaller values are regarded as the numerical values 0, the influence thereof can be small.

In the first modification example, the numerical value 3 is set as a predetermined value as shown by the compression process. Consequently, in the matrix during the compression process, each part of the numerical values filled with dots is regarded as the numerical value 0. Thereafter, omitting the data corresponding to the numerical value 0 makes it possible to compress the number of rows of each of the groups G1a and G2a to three rows as shown after the compression. As a result, the processing time of eight cycles is required before the compression, but can be reduced to six cycles, which makes it possible to achieve a reduction of the processing time.

Second Modification Example

In the first modification example, as can be understood from the matrix after the compression, the data corresponding to the numerical value 0 is not uniform for each column. For example, in the group G1a after the compression and shown in FIG. 18, three significant numerical values are arranged in a data storage sequence 14b d of the unit local memory 14b, and 0 (zero) significant numerical value is arranged in a data storage sequence 14d d. Since the processing time is restricted by a column in which the most significant numerical value is arranged, the processing time of three cycles is required.

In the second modification example, the threshold value is set for each column so that the number of numerical values 0 arranged in the column is the same when viewed for each group in the matrix before the compression. A numerical value less than or equal to the set predetermined value is regarded as the numerical value 0 and will be omitted. In other words, the threshold value is changed for each column so that the number of pieces of significant weight data is the same in the plurality of columns arranged in the same group. This makes it possible to reduce the number of cycles required for group calculation and shorten the processing time.

Figure 19:
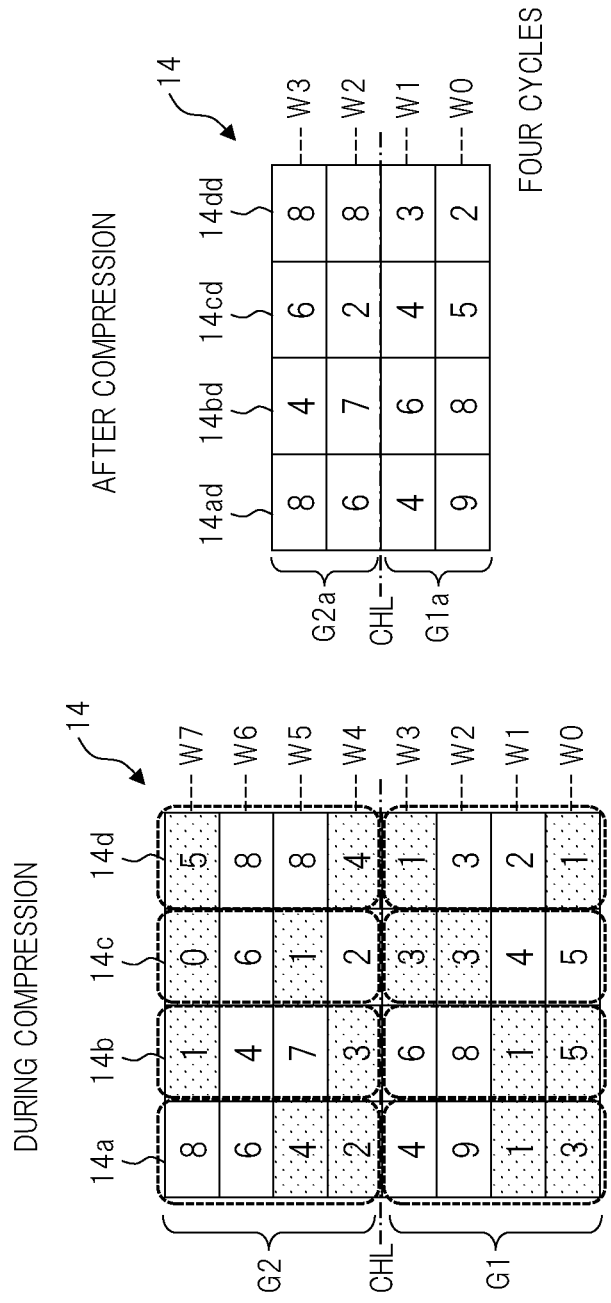
FIG. 19 is a view showing a compressing method according to a second modification example of the first embodiment.

Next, an example of a compression method according to the second modification example will be described with reference to the drawings. FIG. 19 is a diagram showing a compression method according to the second modification example.

The matrix of weight data before the compression is the same as that shown in FIG. 18. Here, a predetermined value is set so that two pieces of weight data remain in each column in each group. For example, in the group G1, a numerical value 3 is set as a threshold value in the column corresponding to the unit local memory 14a. Further, in the same group G1, a numerical value 5 is set as a threshold value in the column corresponding to the unit local memory 14b. Consequently, as shown in the matrix during the compression, in the column corresponding to the unit local memory 14a of the group G1, the parts of the numerical values 1 and 3 are filled with dots, and the two pieces of weight data of the numerical values 4 and 9 remain. Further, in the group G1, in the column corresponding to the unit local memory 14b, two pieces of weight data of the numerical values 6 and 8 remain. Similarly for the remaining columns, a threshold value is set for each column, and the compression is performed so that two pieces of weight data remain in each column. As a result, as shown in FIG. 19, the matrix after the compression has two rows in each of the groups G1a and G2a, and the calculation can be performed in four cycles, which can enhance the effect of shortening the processing time.

Incidentally, in the matrix after the compression, a threshold value may be set again so that a value smaller than this threshold value may be regarded as the numerical value 0 and its data may be omitted to achieve low power due to necessity of the calculation.

Third Modification Example

Figure 20:
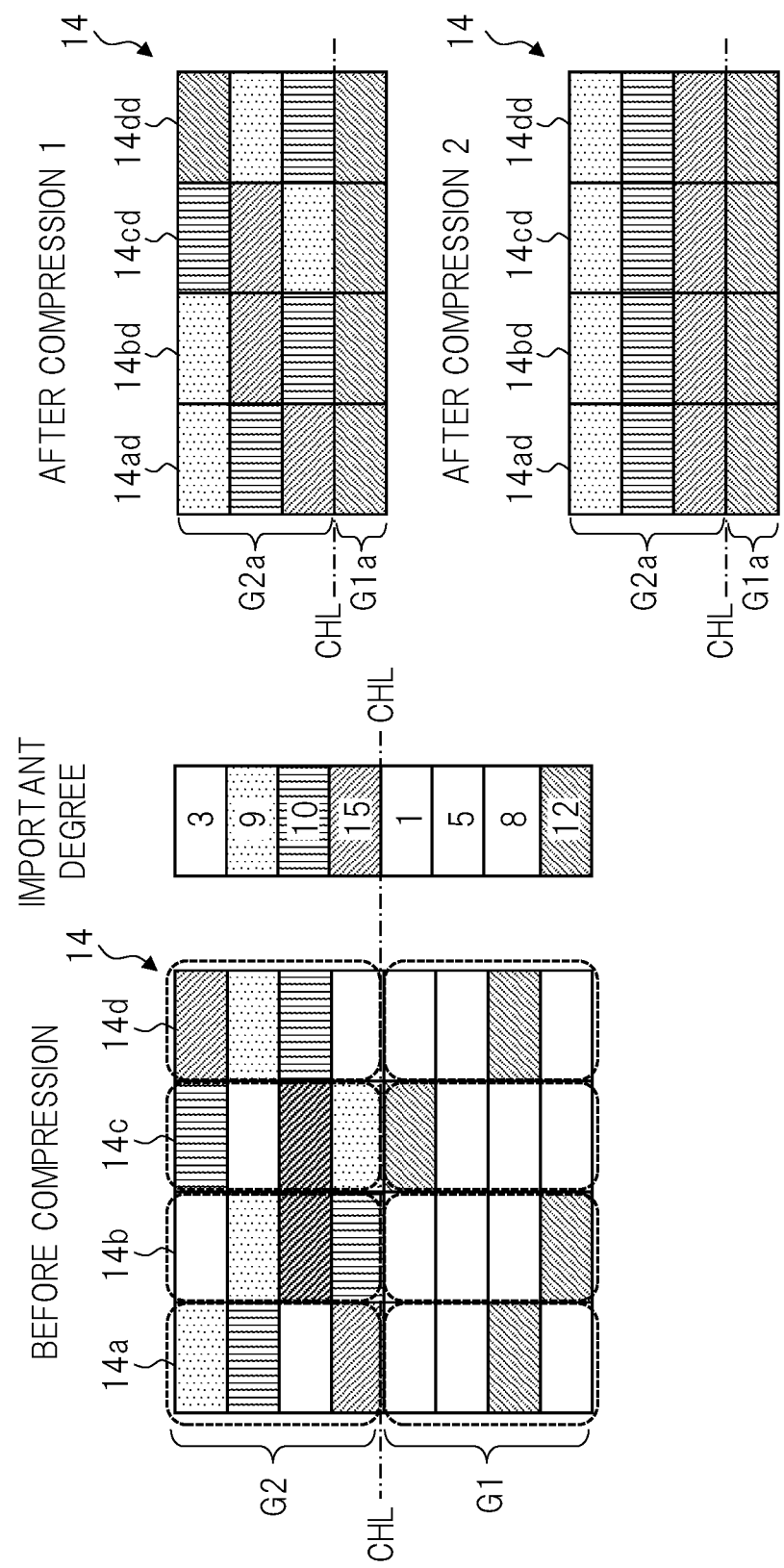
FIG. 20 is a view showing a compressing method according to a third modification example of the first embodiment.

FIG. 20 is a diagram showing a compression method according to a third modification example. The third modification example is a method of using an important degree for the number of rows left for each group. In the group G1, the same figure shows that: an important degree at a case of leaving one row is 12; an important degree at a case of also leaving the second row is 8; an important degree at a case of also leaving the third row is 5; and an important degree at a case of also leaving the fourth row is 1. Also, in the group G2, the same figure shows that: an important degree at a case of leaving the first row is 15; an important degree at a case of also leaving the second line is 10; an important degree at a case of also leaving the third row is 9; and an important degree at a case of also leaving the fourth row is 3.

This important degree of leaving the row can be determined based on an effect in a case of leaving an important value(s) in the column in order from its top in each group. For example, in each group, the maximum value of each column can be obtained as the sum of all columns, and can be used as an important degree at a case of leaving the first row. Similarly, the sum of all columns with the second largest value in each column is used as an important degree at a case of leaving the second row. When looking at each column in the group, the important degree of leaving each value can be shown as a representative value of a column in order from the most important value. However, a method of obtaining a representative value of a row that can show a value of increasing the number of rows to be left is not limited to the above-mentioned method of using the maximum value or calculating the sum of all the columns.

In the matrix groups G1 and G1a shown in FIG. 20, the weight data with left-downward slanting lines indicates weight data having the largest value in the column in which the weight data is arranged. Further, in the matrix groups G2 and G2a shown in FIG. 20, the weight data with right-downward slanting lines indicates weight data having the largest value in the column in which the weight data is arranged, and the weight data with vertical lines indicates is provided with a vertical line. The weight data shows weight data having the second largest value in the column in which the weight data is arranged. Moreover, in the matrix groups G2 and G2a shown in FIG. 20, the weight data with dots indicates weight data having the third largest value in the column in which the weight data is arranged, and the blank weight data indicates weight data having the smallest value in the column in which the weight data is arranged.

At the compression, how many rows to be left is set for the entire group. The row(s) with high important degree is left according to the number of lines set. For example, if four rows to be left is set for the entire group, important degree 15, 12, 10, and 9 are candidates. In this case, one row (important degree 12) is left from the group G1, and three rows (important degree 15, 10, 9) are left from the group G2.

Since the one row is left from the group G1, the weight data with the largest numerical value is left from each column (unit local memories 14a to 14d) of the group G1. That is, in the same column, the weight data having the largest numerical value (weight data with right-upward slanting lines) is left and the remaining pieces of weight data are regarded as the numerical values 0 and are omitted. Similarly, in the group G2, three pieces of weight data having a large numerical value are left from each column (unit local memories 14a to 14d). That is, in the same column, three pieces of weight data having a large numerical value are left, and the remaining one piece of weight data (blank weight data) is regarded as the numerical value 0 and is omitted. This makes it possible to perform calculations in four cycles by using the wight data with high important degree.

The compression makes it possible to generate a matrix of after compression 1 or after compression 2. The matrix of after compression 1 is generated by simply deleting the less important degree from the matrix before the compression. That is, in one group, an arrangement relationship between the mutual pieces of weight data when viewed from the row(s) is the same as an arrangement relationship of the matrix before the compression.

In contrast, in the matrix of after compression 2, the pieces of weight data in each group are rearranged in order of high important degree. Taking the group G2 as an example, the weight data having the largest value in the same column is arranged in the lowermost row, and is rearranged so as to be arranged in the upper row as the value becomes smaller thereafter. In this way, even if the calculation is, for example, stopped in midstream in the group, arranging the weight data with high important degree on a lowermost row side makes it possible to suppress an influence due to the cancellation.

When the product-sum operation is performed by using the matrix of after compression 1, an arrangement relationship between the mutual pieces of weight data in the same column is maintained, so that as the first additional information, the additional information described with reference to FIGS. 9 and 10 can be used. In contrast, when the product-sum operation is performed by using the matrix of after compression 2, the original position of each piece of weight data requires to be specified as the first additional information, so that the calculation leads to being executed by using the additional information shown in FIG. 9.

Second Embodiment

Described in the first embodiment has been a case where: the weight data (for example, WDa in FIG. 6) outputted from the unit local memory has the same bit width (16 bits) as that of the input data (for example, DL0); and both the weight data and the input data are of an INT type or FP type and represent numerical values. In a second embodiment, the input data represents a numerical value by an INT type or FP type similarly to the first embodiment, but the weight data is binary data representing multiple values. In the second embodiment, shown is an example of a parallel arithmetic circuit in which each bit of the weight data outputted from the unit local memory represents binary weight.

Figure 21:
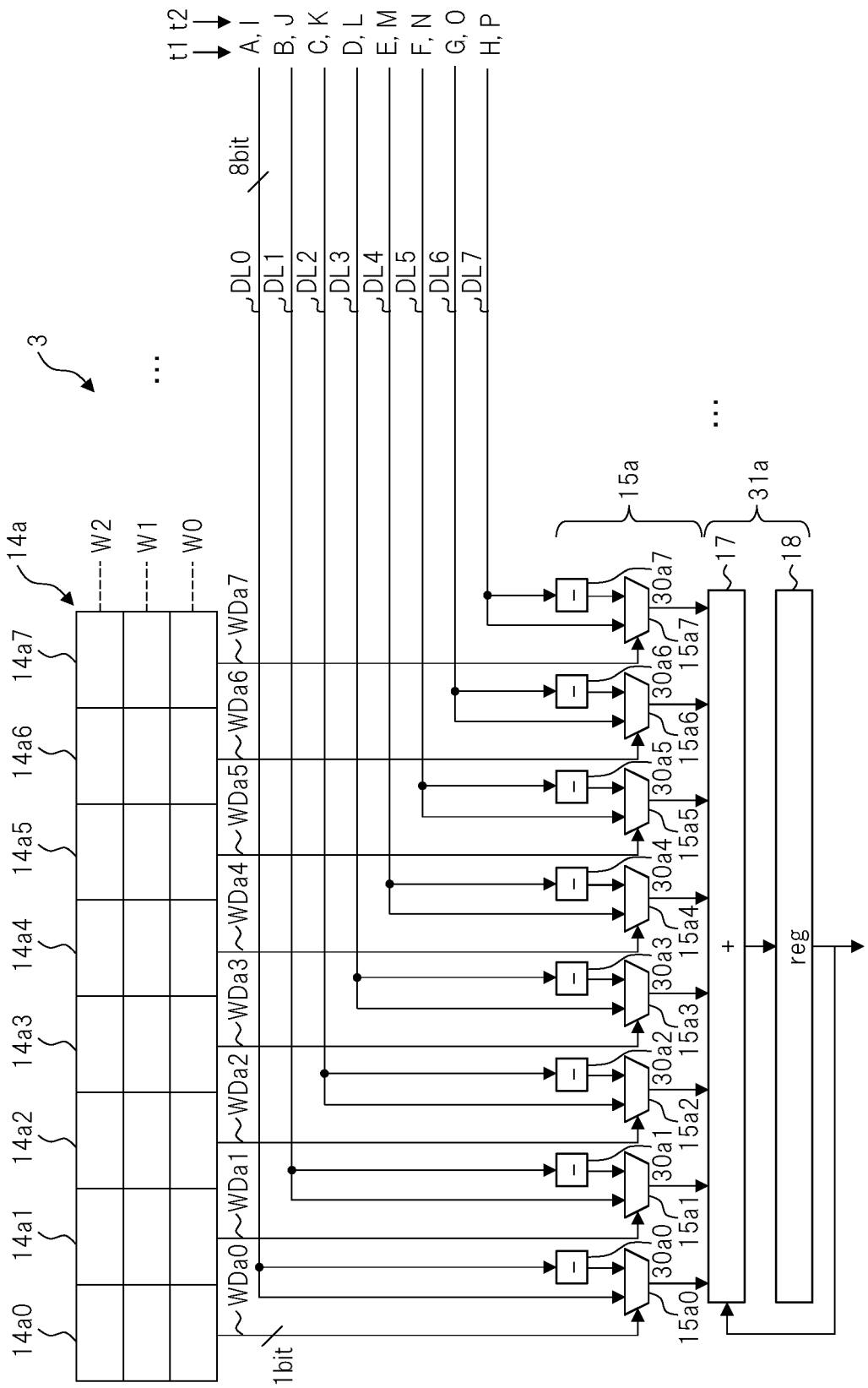
FIG. 21 is a block diagram showing a configuration of a parallel arithmetic circuit according to a second embodiment.

FIG. 21 is a block diagram showing a configuration of a parallel arithmetic circuit according to a second embodiment. The parallel arithmetic circuit 3 is configured by a plurality of unit local memories 14a to 14m, a plurality of unit selectors 15a to 15m, and a plurality of summation operation units 31a to 31m. Drawn in FIG. 21 are, as a representative, only one unit local memory 14a, corresponding unit selector 15a, and corresponding summation operation unit 31a. The remaining unit local memories, unit selectors, and summation operation units are similar to those shown in FIG. 21. Further, eight pieces of input data are composed of the reference numerals DL0 to DL7. The pieces of data A to H are simultaneously supplied as the input data DL0 to DL7 to the unit selector 15a at time t1. Following the time t1, at time t2, the pieces of data I to P are simultaneously supplied as the input data DL0 to DL7 to the unit selector 15a. In order to avoid making the drawings complicated, a case where each piece of the input data DL0 to DL7 (A to P) has an 8-bit width will be described here, but the present invention is not limited to this and the input data may have, for example, a 16-bit width.

The unit local memory 14a includes eight memory sequences 14a0 to 14a7. One-bit weight data is outputted from each of the memory sequences 14a0 to 14a7. For example, when the word W0 is selected, the pieces of weight data stored in the lowermost row of the memory sequences 14a0 to 14a7 are simultaneously read as weight data WDa0 to WDa7 and are supplied to the unit selector 15a. Of course, the unit local memory 14a may be regarded as a memory that outputs eight pieces of 1-bit width data.

The unit selector 15a functions as a unit operation unit (unit product operation unit) that performs an operation between a value from the memory and a value of the input data. The unit selector (unit product operation unit) 15a performs multiplications between the values 14a0 to 14a7 from the memory and the values of the input data DL0 to DL7, respectively. Since each value from the memory means +1 or −1, each unit selector is equivalent to a result of the product operation if the input data value is outputted as it is or by a sign inversion value according to the value from the memory. Therefore, the present embodiment includes a plurality of selector units 15a0 to 15a7 corresponding to the memory sequences 14a0 to 14a7, and a plurality of sign inverters 30a0 to 30a7. When the weight has a 1-bit width, it means that the input data is multiplied by +1 or −1, so that the values as they are with respect to the input data DL0 to DL7 and the values which have sign-inverted the input data values by the sign inverters 30a0 to 30a7 are inputted to the selector units 15a0 to 15a7. Further, since the weight data WDa0 to WDa7 are inputted to the above-mentioned selector, the value obtained by multiplying the input data by the weight is outputted from the selector by selecting the value of the input data as it is or the value of the sign inversion according to the inputted value.

The summation operation unit 31a includes an adder 17 and a register 18. The adder 17 adds outputs from the selector units 15a0 to 15a7 and an output from the register 18, and supplies an addition result to the register 18. Consequently, the product-sum operation result is outputted from the register 18.

That is, simultaneously performed between the eight pieces of weight data WDa0 to WDa7 simultaneously outputted from the unit local memory 14a and the eight pieces of data A to H simultaneously outputted as the input data DL0 to DL7 at the time t1 are the calculation and the addition. The addition results are accumulated and become the product-sum operation result.

According to the parallel arithmetic circuit 3 shown in FIG. 21, since the eight calculations can be performed at the same time, operation speed can be improved eight times, so that the processing time can be shortened. Further, in the parallel arithmetic circuit 3 of FIG. 21, since the product operation unit 16 as shown in FIG. 6 is not required, an increase in area can be suppressed.

First Modification Example

Figure 22:
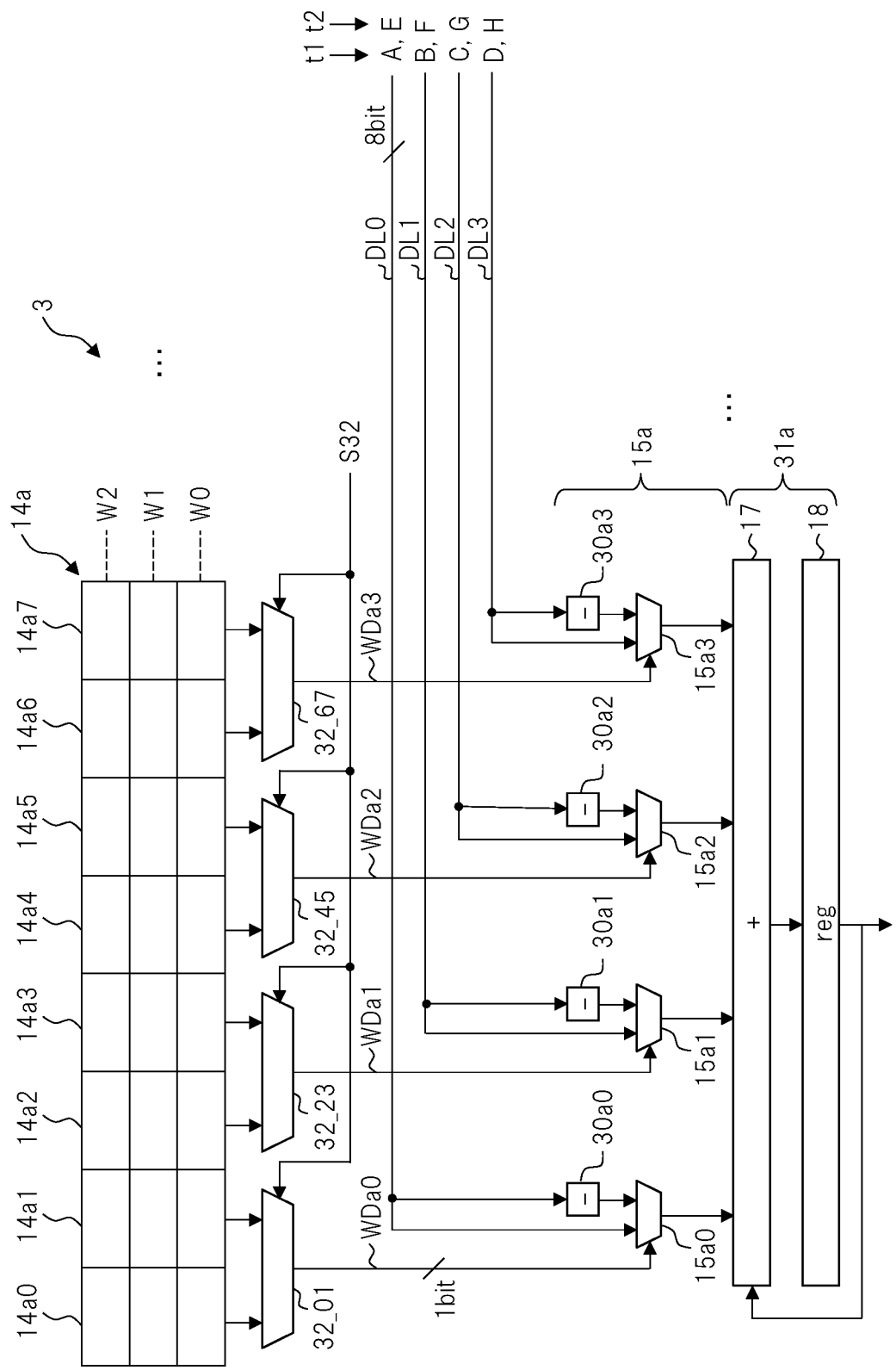
FIG. 22 is a block diagram showing a configuration of a parallel arithmetic circuit according to a first modification example of the second embodiment.

FIG. 22 is a block diagram showing a configuration of a parallel arithmetic circuit according to the first modification example. As compared with FIG. 21, in FIG. 22, the number of pieces of input data is reduced to four of DL0 to DL3, and an internal configuration of the product operation unit 15a is also reduced to four. In contrast, the unit local memory 14a includes eight memory sequences 14a0 to 14a7 similarly to that of FIG. 21 so that, by selecting a word (for example, W0), eight pieces of weight data are read out at the same time. That is, the present modification example has an asymmetrical configuration in which the number of pieces of input data and the number of pieces weight data read from the unit local memory do not match.

In the first modification example, four read selectors 32_01 to 32_67 are added to the parallel arithmetic circuit 3. Each read selector corresponds to two memory sequences, selects one piece of weight data from the two pieces of weight data read from the corresponding two memory sequences according to the selection signal S32, and supplies it to the corresponding selector unit. Taking the read selector 32_01 as an example, this read selector 32_01 corresponds to the memory sequences 14a0 and 14a1. The read selector 32_01 selects the read data from the weight data read from the memory sequences 14a0 and 14a1 according to the selection signal S32 and supplies, as weight data WDa0, it to the selector unit 15a0.

In the first modification example, the unit local memory 14a is read once while the adder 17 performs the addition operation twice. That is, when one addition operation is regarded as one cycle, the unit local memory 14a is read once every two cycles.

The selection signal S32 changes so as to designate a different memory sequence for each cycle. Consequently, the read selector 32_01 selects, for example, the weight data read from the memory sequence 14a in the first cycle, and selects the weight data read from the memory sequence 14a in the second cycle. Performed between the selected weight data and the input data DL0 in the same manner as described with reference to FIG. 21 is the calculation.

In the first modification example, the product-sum operation is performed by dividing the eight pieces of input data into four pieces of input data. Therefore, as compared with FIG. 21, the operation speed is quadrupled, which is half that of FIG. 22. However, since the number of selector units and the number of adders can be reduced and a summation operation processing simultaneously executed by the summation operation unit 31 can be reduced, the increase in the area can be suppressed.

Third Embodiment

Figure 23:
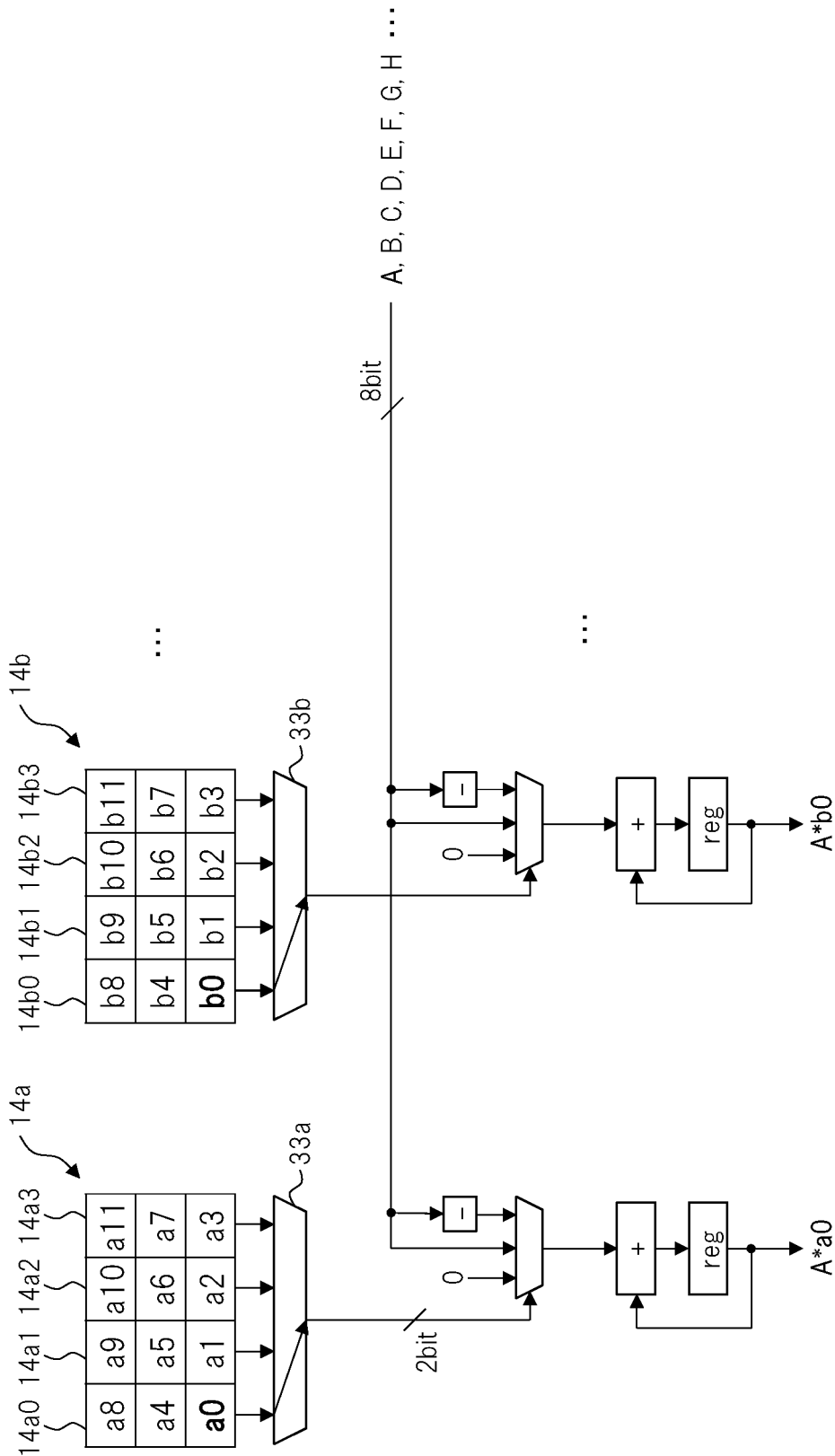
FIG. 23 is a block diagram showing a configuration of a parallel arithmetic circuit, which uses trivalent weight, according to the second embodiment.

In a third embodiment, shown is an example of a parallel arithmetic circuit when each bit of the weight data outputted from the unit local memory represents ternary weight as a multiple value, and the input data is of an INT type or FP type and represents a numerical value. The weight data has a 2-bit width to indicate the ternary value. Of course, the ternary value is an example, and the present embodiment may be a multiple value of quaternary or more values.
<When Input Data is Serial.>
First, an example in which pieces of input data A to H having an 8-bit width are sequentially supplied to a parallel arithmetic circuit and a product-sum operation is executed will be described with reference to the drawings. FIG. 23 is a block diagram showing a configuration of a parallel arithmetic circuit using ternary weight.

When the data A is supplied to the parallel arithmetic circuit in the first cycle, the 2-bit width weight data indicating the ternary weight is read from each of the memory sequences 14a0 to 14a3 of the unit local memory 14a. The selector 33a selects one piece of weight data from the four pieces of weight data read out. In FIG. 23, the weight data "a0" read from the memory sequence 14a0 is selected. A product operation with the data A is performed according to the selected weight data, and a product operation result A*a0 is outputted. Similarly, the 2-bit width weight data indicating the ternary weight is read from each of the memory sequences 14b0 to 14b3 of the unit local memory 14b. The product operation of the selected weight data "b0" and the data A is performed, and a product operation result A*b0 is outputted.

Next, when the data changes from A to B (at second cycle), the selectors 33a and 33b select the weight data "a1" and "b1" read from the memory sequences 14a1 and 14b1. The product operation of the weight data and the data B is performed, and its result is added to the previously obtained product operation result. As a result, the product-sum operation result corresponding to the unit local memory 14a becomes A the previously obtained product calculation result A*a0+B*a1. When the data changes to C (at third cycle), the two pieces of weight data a2 and b2 read from the memory sequences 14a2 and 14b2 are selected. Next, when the data changes to D (at third cycle), the two pieces of weight data a3 and b3 read from the memory sequences 14a3 and 14b3 are selected. Consequently, the product-sum operation leads to being performed between the weight data and the data A to D. That is, the pieces of weight data simultaneously read from the unit local memories are packed with four pieces of 2-bit width weight data. These four packs are sequentially calculated with the data A to D.

Since the weight data stored in the unit local memory as the weight data is made weight data indicating ternary, capacity of the local memory and power consumption can be reduced. However, when the product-sum operation is performed to the data A to D, four cycles are required and improvement of the operation speed is difficult.
<Parallel Arithmetic Circuit According to Third Embodiment>

Figure 24:
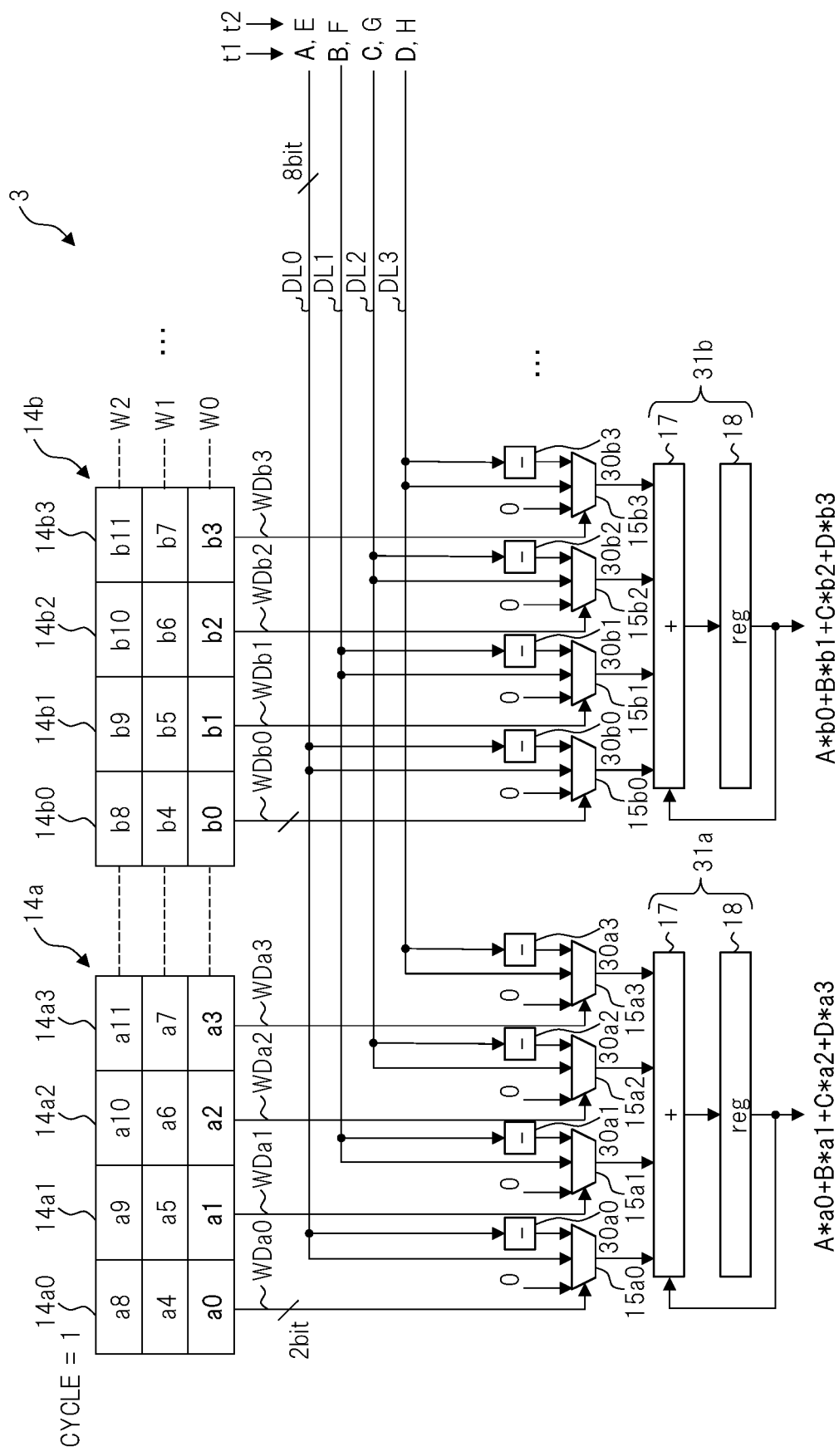
FIG. 24 is a block diagram showing a configuration of a parallel arithmetic circuit according to a third embodiment.
Figure 25:
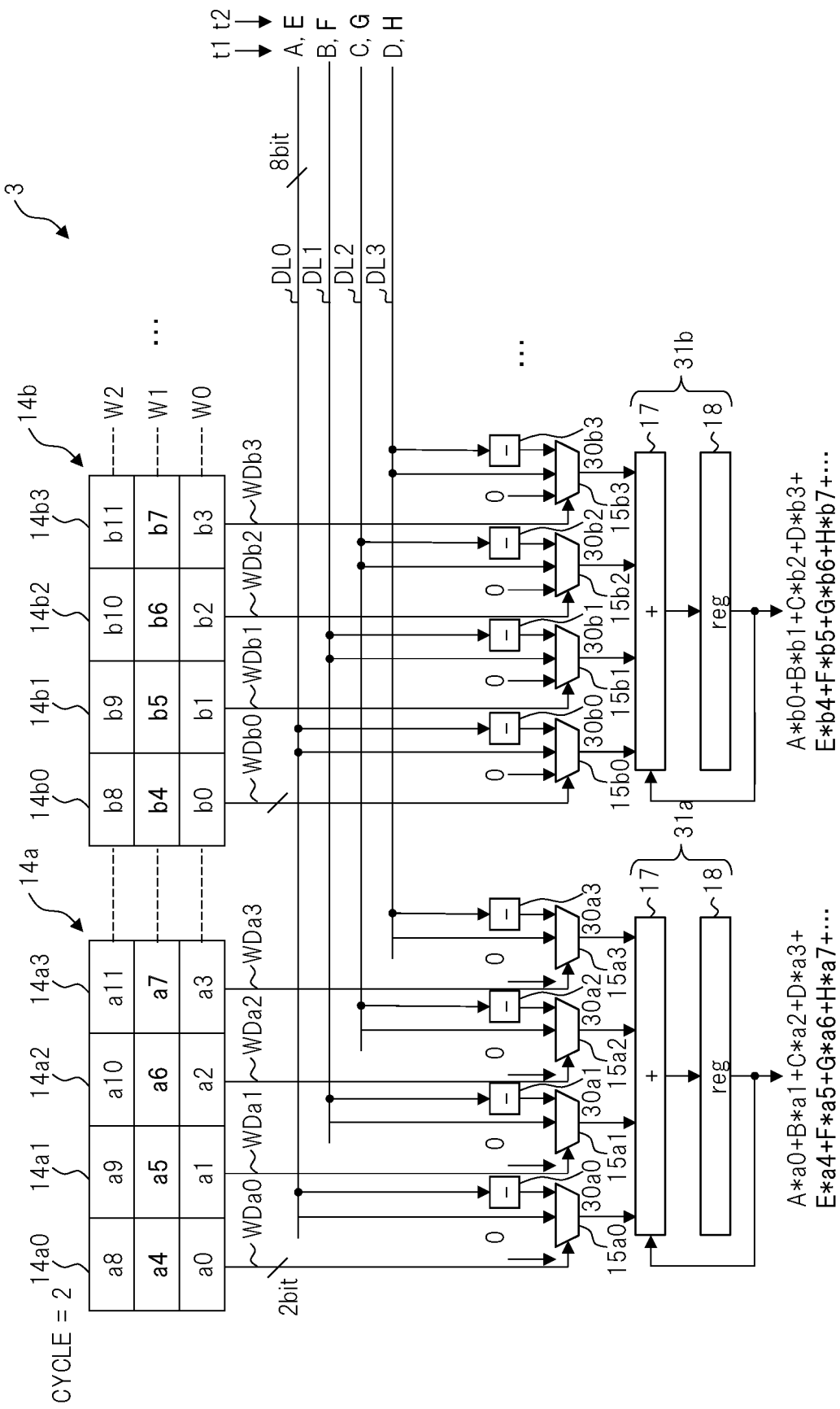
FIG. 25 is a block diagram showing a configuration of the parallel arithmetic circuit according to the third embodiment.

Next, the configuration of the parallel arithmetic circuit according to the third embodiment will be described with reference to the drawings. FIGS. 24 and 25 are block diagrams each showing the configuration of the parallel arithmetic circuit according to the third embodiment.

The parallel arithmetic circuit 3 according to the third embodiment includes a local memory, a selector unit, a sign inverter, and a summation operation unit. As shown in FIG. 6, the local memory includes a plurality of unit local memories. In FIG. 24, only the unit local memories 14a and 14b are drawn among the plurality of unit local memories that the local memory has. Further, in FIG. 24, drawn as representatives are only the selector units 15a0 to 15a3 and 15b0 to 15b3 corresponding to the unit local memories 14a and 14b, and the sign inverters 30a0 to 30a3 and 30b0 to 30b3. Moreover, in FIG. 24, drawn as a representative also regarding a summation operation unit are only the summation operation units 31a and 31b corresponding to the unit local memories 14a and 14b.

The unit local memory 14a and a component(s) corresponding thereto will be described as an example, but the same applies to the remaining unit local memories and components corresponding thereto.

The unit local memory 14a includes memory sequences 14a0 to 14a3. Since the common words W0 to W2 in the local memory 14 are selected, weight data WDa0 to WDa3 from portions (memory cell for 2 bits) connected to the selected words in each of the memory sequences 14a0 to 14a3 are readout simultaneously. Here, each piece of the weight data WDa0 to WDa3 is 2-bit width data indicating binary weight.

Input data DL0 to DL3 are supplied to the sign inverters 30a0 to 30a3. The sign inverters 30a0 to 30a3 generate and output values whose signs are inverted with respect to the supplied input data DL0 to DL3.

The selector units 15a0 to 15a3 are supplied with corresponding input data DL0 to DL3, −1 multiple of the input data generated by the sign inverters 30a0 to 30a3, and fixed data corresponding to the numerical value 0. The selector units 15a0 to 15a3 select data from the supplied input data, −1 multiple of the input data, and a fixed value 0 according to the corresponding weight data WDa0 to WDa3, and output it to the corresponding summation operation unit 31a. This means that any of +1, −1, and 0 multiples of the input data is performed according to the weight value. Taking the memory sequence 14a0 as an example, the input data DL0 is supplied to the corresponding sign inverter 30a0 and the selector unit 15a0. The selector unit 15a0 selects any of the input data DL0, its sign inversion value, and the fixed data 0 according to the weight data WDa0 from the memory sequence 14a0, and outputs it to the summation operation unit 31a.

The summation operation unit 31a includes an adder 17 and a register 18 similarly to the summation operation unit described with reference to FIG. 21, adds the data supplied from the selector units 15a0 to 15a3, and outputs it as a product-sum operation result.

At the time t1 in the first cycle, the pieces of data A to D are supplied as pieces of input data DL0 to DL3 to the parallel arithmetic circuit 3. In this first cycle, the word W0 is selected. Consequently, the pieces of 2-bit width weight data "a0, a1, a2, a3" are simultaneously read as the four pieces of weight data WDa0 to WDa3 from the unit local memory 14a. At this time, the pieces of 2-bit width weight data "b0, b1, b2, b3" are simultaneously read as the four pieces of weight data WDb0 to WDb3 from the unit local memory 14b.

The selector units 15a0 to 15a3 select data according to the supplied weight data "a0, a1, a2, a3", and output the selected data to the summation operation unit 31a. As a result, an operation result A*a0+B*a1+C*a2+D*a3, which is obtained by the product-sum operation performed between the input data A to D and the weight data "a0, a1, a2, a3", is outputted from the summation operation unit 31a. Similarly, in the first cycle, an operation result A*0+B*b1+C*B2+D*b3, which is obtained by the product-sum operation unit performed between the input data A to D and the weight data "b0, b1, b2, b3", is outputted from the summation operation unit 31b.

A state of the second cycle is shown in FIG. 25. In the second cycle, the data E to H are supplied as the input data DL0 to DL3 to the parallel arithmetic circuit 3. Further, in the second cycle, the word W1 is selected. Consequently, the pieces of 2-bit width weight data "a4, a5, a6, a7" are simultaneously read as the pieces of weight data WDa0 to WDa3 from the unit local memory 14a. As a result, an operation is performed between the data E to H and the weight data "a4, a5, a6, a7", and a sum of its operation result and the previous operation result as shown in FIG. 25 is outputted from the summation operation unit 31a.

Similarly, in the second cycle, the pieces of 2-bit width weight data "b4, b5, b6, b7" are simultaneously read as the pieces of weight data WDb0 to WDb3 from the unit local memory 14b. As a result, an operation is performed between the input data E to H and the weight data "b4, b5, b6, b7", and a sum of its operation result and the previous operation result as shown in FIG. 25 is outputted from the summation operation unit 31b.

According to the third embodiment, the number of cycles required for the calculation can be reduced to two cycles, and the operation speed can be improved.

First Modification Example

Figure 26:
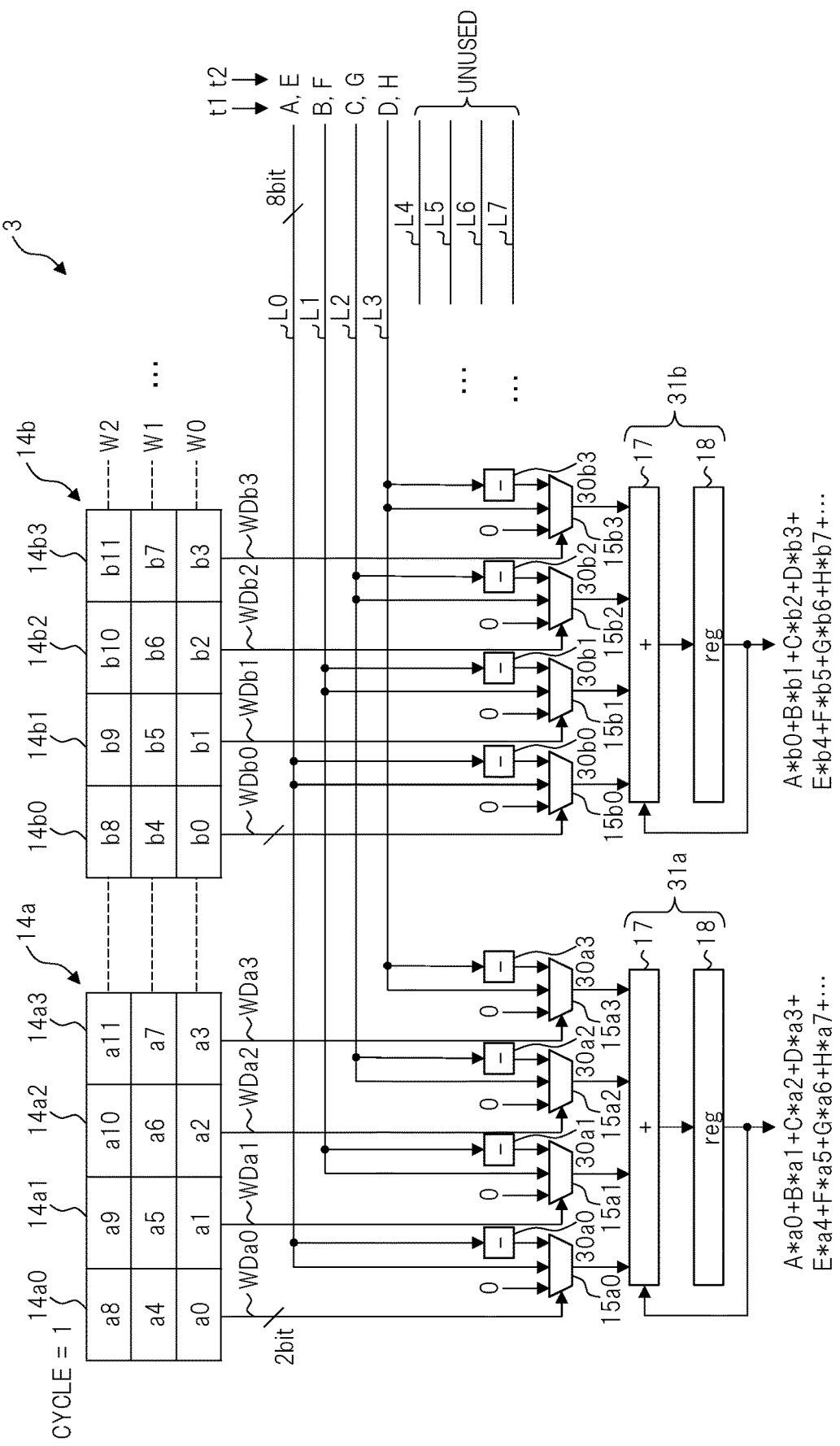
FIG. 26 is a block diagram showing a configuration of a parallel arithmetic circuit according to a first modification example of the third embodiment.

FIG. 26 is a block diagram showing a configuration of a parallel arithmetic circuit according to a first modification example. In the first modification example, a parallel arithmetic circuit is provided when the number of pieces of weight data read simultaneously from the unit local memory is different from the number of pieces input data.

FIG. 26 is similar to FIG. 25. A difference therebetween is that the number of signal wiring groups transmitting input data is eight (L0 to L7). In the first modification example, only the four signal wiring groups L0 to L3 out of the eight signal wiring groups L0 to L7 are used, and the remaining four signal wiring groups L4 to L7 are unused. Data A to D and data E to H are supplied in a time-division manner to the four signal wiring groups L0 to L3. That is, at time t1, the pieces of data A to D are supplied as pieces of input data DL0 to DL3 via the signal wiring groups L0 to L3 and, at time t2, the pieces of data E to H are supplied as pieces of input data DL0 to DL3 via the signal wiring groups L0 to L0. Consequently, even when the number of pieces of weight data read simultaneously from the unit local memory is different from the number of pieces of input data and is asymmetrical, the operation speed can be made high speed.

Fourth Embodiment

Figure 27:
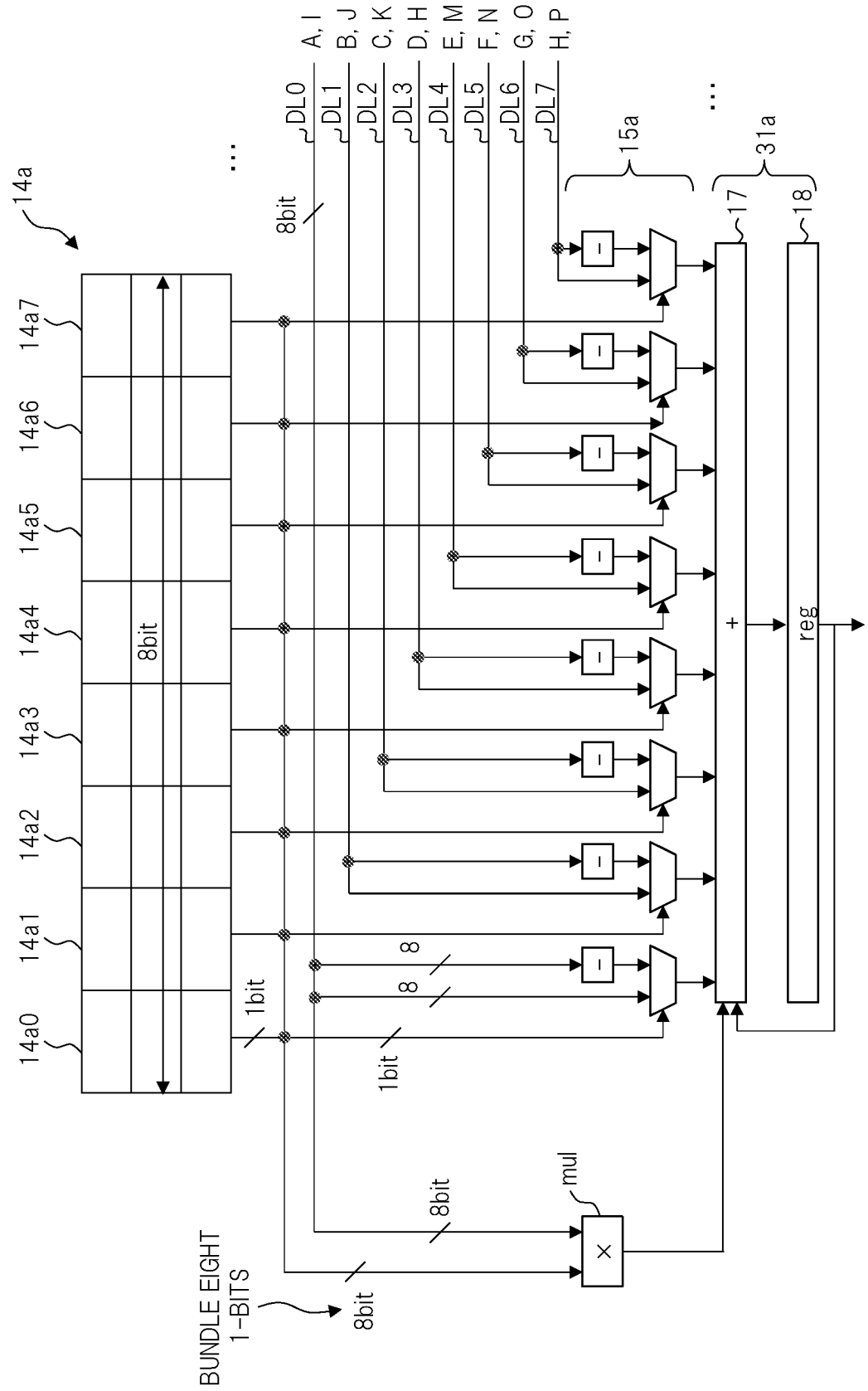
FIG. 27 is a block diagram showing a configuration of a parallel arithmetic circuit according to a fourth embodiment.
Figure 28:
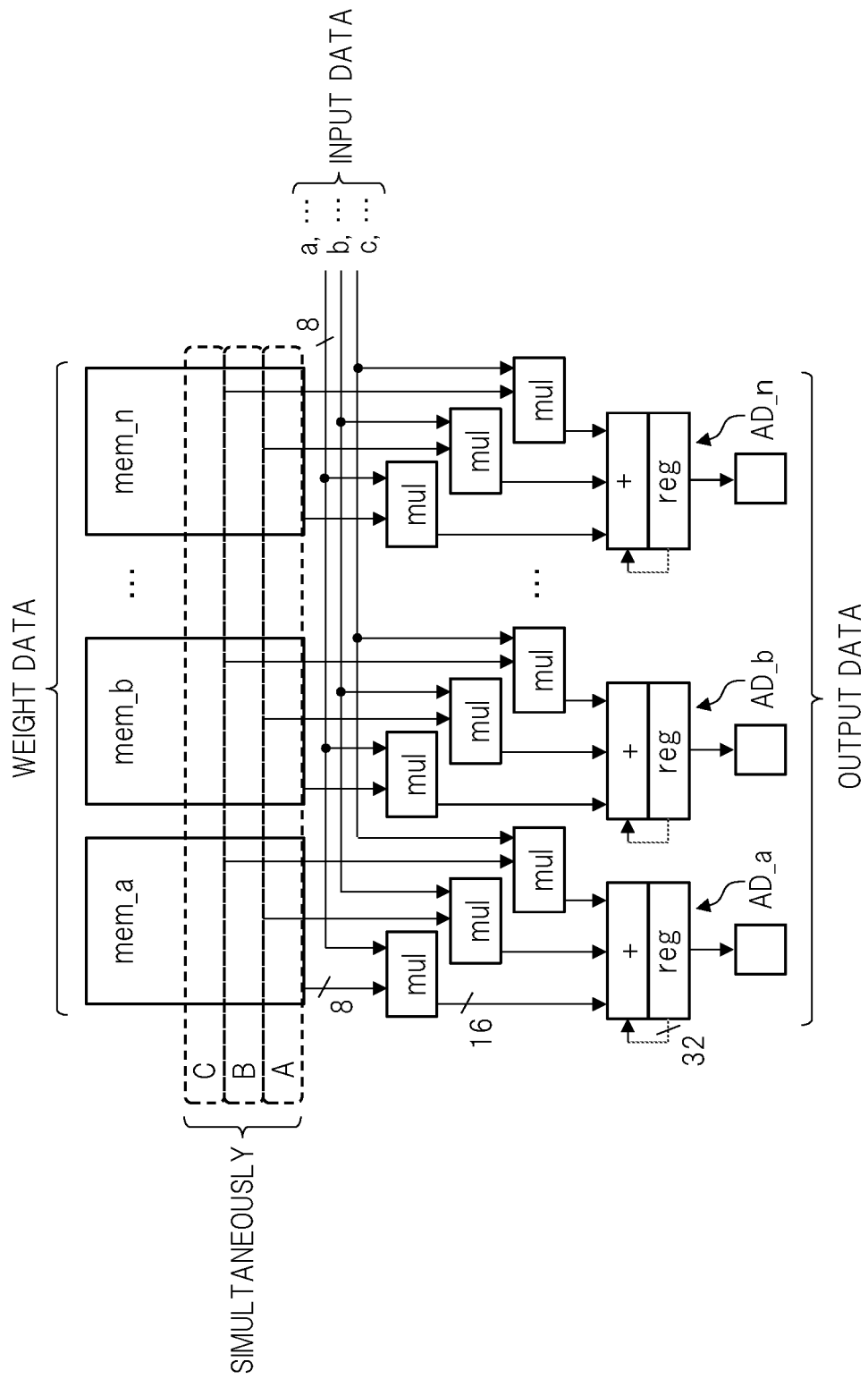
FIG. 28 is a block diagram showing a configuration of a parallel arithmetic circuit of a comparative example.
Figure 29:
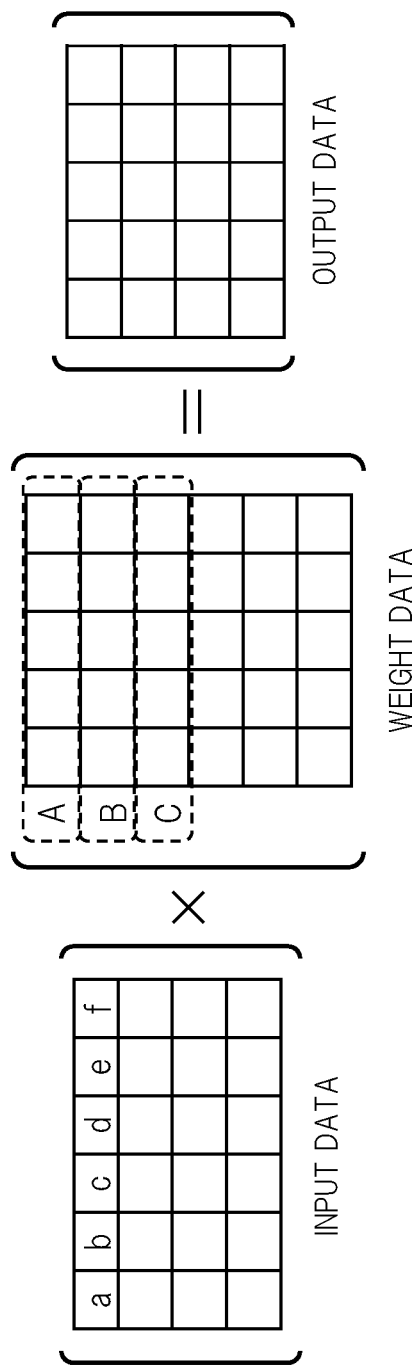
FIG. 29 is a diagram showing an operation of the parallel arithmetic circuit shown by FIG. 28.

FIG. 27 is a block diagram showing a configuration of a parallel arithmetic circuit according to a fourth embodiment. The parallel arithmetic circuit according to the fourth embodiment includes an arithmetic part that performs an operation with a narrow bit width and a conventional parallel arithmetic part, and these two arithmetic parts are exclusively used. Here, a case where the parallel arithmetic circuit shown in FIG. 21 is used as the arithmetic part that performs the operation with the narrow bit width will be described as an example, but the present invention is not limited to this, of course.

The unit local memory 14a, the unit selector (unit product operation unit) 15a, and the summation operation unit 31a in FIG. 27 are the same as those shown in FIG. 21.

In FIG. 27, the reference symbol mul indicates an 8-bit parallel arithmetic unit (parallel arithmetic part). In FIG. 27, one piece of 1-bit data is bundled from each of the memory sequences 14a0 to 14a7 of the unit local memory 14a, and is supplied to the parallel arithmetic part mul. The parallel arithmetic part mul executes a product operation in parallel between the 8-bit data in the input data DL0 and the 8-bit data from the unit local memory 14a, and supplies its operation result to the summation operation unit 31a.

Although not particularly limited, the summation operation unit 31a selects the product operation result from the unit selector 15a or the product operation result from the parallel arithmetic part mul, and accumulates and outputs the selected result.

That is, the parallel arithmetic circuit according to the fourth embodiment includes a mode of using the conventional parallel arithmetic part mul and a mode of using the narrow bit width arithmetic part, and can make a selection so as to be capable of exclusively using these two modes.

FIG. 27 shows an example in which the 8-bit width outputted from the unit local memory 14a is divided into eight (n) pieces of 1-bit width data, but the present invention is not limited to this. For example, four pieces of 2-bit width data may be used by dividing the 8-bit width into n/2 pieces (=4 pieces). Incidentally, although the unit selector 15a and the summation operation unit 31a are drawn relatively large in FIG. 27, they can actually be configured by circuits each having a relatively small occupied area.

Additional Statement

The present specification discloses not only the inventions described in a scope of patent claims but also various inventions. The following is a list of typical inventions described in no scope of patent claims.

A. A semiconductor device includes:
a memory outputting in parallel a plurality of pieces of first data each representing multiple values;
a product operation unit corresponding to the plurality pieces of first data, supplied with pieces of data different from each other, and performing a production operation between the corresponding first data and the input data; and
a computing unit adding and accumulating a plurality of pieces of data outputted from the product operation unit, and outputting a product-sum operation result.

A1. The semiconductor device described in the A, the product operation unit selects, by a selector according to the first data, any of input data, predetermined fixed data, and data processing the input data.

A2. The semiconductor device described in the A, data generated by executing a predetermined operation to the input data is further supplied to the selector unit.

A3. The semiconductor device described in the A2, the first data is one piece of 1-bit data indicating a binary value.

A4. The semiconductor device described in the A2, the first data is one piece of 2-bit data indicating a ternary value.

B. A parallel arithmetic circuit includes:
a memory capable of supplying individual values to a plurality of computing units every cycle; and
an external input capable of supplying individual values different from the individual values to each computing unit every cycle,
wherein one unit is configured to have a mechanism for combining outputs from the plurality of computing units into one,
wherein a plurality of units composed of the unit are arranged in parallel and a data supply of the external input is common to all of the units.

B1. The parallel arithmetic circuit described in the B, each value supplied from the memory to the computing units has 1- to 2-bit width.

B2. The parallel arithmetic circuit described in the B, the computing unit performs an operation equivalent to multiplication, and the mechanism for combining them into one is an accumulative mechanism.

C. A parallel arithmetic circuit divides, in one unit, an n-bit width value from a memory into n 1-bit width values, and uses the n 1-bit width values to perform in-unit operations in n parallels.

C1. The parallel arithmetic circuit described in the C, the parallel arithmetic circuit can select, in one unit, either of use of a n-bit width value from the memory to compute it in one parallel and the C.

D. A parallel arithmetic circuit can use, in one unit, am-bit width value among n-bit width values from a memory to divide it into m 1-bit width values, and use the m divided values to perform an in-unit operation in m parallels.

D1. The parallel arithmetic circuit described in the D, n>m, where m is a divisor of n.

D2. The parallel arithmetic circuit described in the D, the parallel arithmetic circuit can select, in one unit, either of use of an n-bit width value from a memory to compute it in one parallel and the C.

E. A parallel arithmetic circuit divides, in one unit, an n-bit width value from a memory into n/2 2-bit width values, and uses the n/2 2-bit width values to perform in-unit operations in n/2 parallels.

E1. The parallel arithmetic circuit described in the E, the parallel arithmetic circuit can select, in one unit, either of use of a n-bit width value from a memory to compute it in one parallel and the E.

F. A parallel arithmetic circuit can use, in one unit, am-bit width value among n-bit width values from a memory to divide it into m/2 2-bit width values, and use the m/2 divided values to perform an in-unit operation in m/2 parallels.

F1. The parallel arithmetic circuit described in the F, n>m, where m is a divisor of n.

F2. The parallel arithmetic circuit described in the F, the parallel arithmetic circuit can select, in one unit, either of use of a n-bit width value from a memory to compute it in one parallel and the F.

As described above, although the inventions made by the present inventor(s) have been specifically described based on the embodiments, the present invention is not limited to the embodiments and, needles to say, can be variously modified without departing from the scope thereof. For example, the example in which the weight data is supplied from the local memory to the parallel arithmetic circuit has been shown, but the present invention is not limited to this. Similarly, a source of the input data is not limited.

What is claimed is:
1. A semiconductor device comprising:
a memory outputting a plurality of pieces of first data in parallel;
a parallel arithmetic circuit including:
a plurality of product-sum arithmetic circuits corresponding to the plurality of pieces of first data; and
a plurality of selectors corresponding to the plurality of product-sum arithmetic circuits, supplied with a plurality of pieces of second data in parallel,
wherein the parallel arithmetic circuit is configured to perform:
an omitting step of omitting, in a plurality of pieces of original data arranged in a matrix, one piece of original data corresponding to a predetermined value from the plurality of pieces of original data arranged in a column;
a compressing step of being filled with the plurality of pieces of original data on an upper row arranged in the same column as that of the original data omitted in the omitting step instead of the omitted original data; and an additional information generating step of generating, in the plurality of pieces of second data, additional information indicating a position of second data to be computed with the plurality of pieces of original data not omitted in the omitting step, wherein the plurality of pieces of original data arranged in the same row are generated as the plurality of pieces of first data, wherein, in the plurality of pieces of original data arranged in the matrix, a small value among the plurality of pieces of original data arranged in the same column is set as a threshold value, and a value smaller than the threshold value is set as the predetermined value, wherein, in the plurality of pieces of original data arranged in the matrix, the threshold value in each column is set so that the pieces of original data arranged in each column are equal to each other in number, wherein the plurality of selectors selects one piece of second data from the supplied plurality of pieces of second data according to the additional information, and outputs the selected one piece of second data, and wherein each of the plurality of product-sum arithmetic circuits performs a product-sum operation between the first data different from each other in the plurality of first data and the second data outputted from the corresponding selectors.

2. The semiconductor device according to claim 1, wherein the plurality of pieces of first data and a plurality of pieces of additional information comprising the addition information are stored in the memory, and the memory continuously outputs the plurality of pieces of first data different from each other and the plurality of pieces of additional information in a first period, and wherein the plurality of pieces of second data are continuously supplied to the plurality of selectors in the first period.

3. The semiconductor device according to claim 2, wherein a plurality of pieces of first data compressed to reduce data corresponding to a numerical value 0 are stored in the memory.

4. The semiconductor device according to claim 3, wherein a plurality of pieces of second data different from the plurality of pieces of second data supplied in the first period are supplied to the plurality of selectors in a second period following the first period.

5. A data generation method of generating a plurality of pieces of first data used for a parallel arithmetic circuit, wherein the parallel arithmetic circuit including:

a plurality of product-sum arithmetic circuits corresponding to the plurality of pieces of first data; and a plurality of selectors corresponding to the plurality of product-sum arithmetic circuits, supplied with a plurality of pieces of second data in parallel, selecting second data from the supplied plurality of pieces of second data according to additional information, and outputting the selected second data to the corresponding product-sum arithmetic circuits, wherein the data generation method comprising:

an omitting step of omitting, in a plurality of pieces of original data arranged in a matrix, one piece of original data corresponding to a predetermined value from the plurality of pieces of original data arranged in a column;

a compressing step of being filled with the plurality of pieces of original data on an upper row arranged in the same column as that of the original data omitted in the omitting step instead of the omitted original data; and an additional information generating step of generating, in the plurality of pieces of second data, additional information indicating a position of second data to be computed with the plurality of pieces of original data not omitted in the omitting step, and wherein the plurality of pieces of original data arranged in the same row are generated as the plurality of pieces of first data, wherein, in the plurality of pieces of original data arranged in the matrix, a small value among the plurality of pieces of original data arranged in the same column is set as a threshold value, and a value smaller than the threshold value is set as the predetermined value, and wherein, in the plurality of pieces of original data arranged in the matrix, the threshold value in each column is set so that the pieces of original data arranged in each column are equal to each other in number.

6. The data generation method according to claim 5, wherein the predetermined value is a numerical value 0.

7. The data generation method according to claim 5, wherein the matrix in which the plurality of pieces of original data are arranged is composed of a plurality of matrices, and each time the plurality of pieces of second data supplied to the selectors vary, the plurality of pieces of first data from the different matrices are supplied to the plurality of product-sum arithmetic circuits, wherein the data generation method further comprises:

an important degree setting step of setting an important degree to each row of the plurality of matrices; and a row number setting step of obtaining, in the plurality of matrices, the number of rows to be left for each matrix based on the important degree set in the important degree setting step according to a specified value for specifying the number of rows to be left, and wherein the predetermined value is set so that the number of rows obtained in the row number setting step is maintained for each column of the matrices.

8. A data generation method of generating a plurality of pieces of first data used for a parallel arithmetic circuit, wherein the parallel arithmetic circuit including:

a plurality of product-sum arithmetic circuits corresponding to the plurality of pieces of first data; and a plurality of selectors corresponding to the plurality of product-sum arithmetic circuits, supplied with a plurality of pieces of second data in parallel, selecting second data from the supplied plurality of pieces of second data according to additional information, and outputting the selected second data to the corresponding product-sum arithmetic circuits, wherein the data generation method comprising:

an omitting step of omitting, in a plurality of pieces of original data arranged in a matrix, one piece of original data corresponding to a predetermined value from the plurality of pieces of original data arranged in a column;

a compressing step of being filled with the plurality of pieces of original data on an upper row arranged in the same column as that of the original data omitted in the omitting step instead of the omitted original data; and an additional information generating step of generating, in the plurality of pieces of second data, additional information indicating a position of second data to be computed with the plurality of pieces of original data not omitted in the omitting step, wherein the plurality of pieces of original data arranged in the same row are generated as the plurality of pieces of first data, wherein the matrix in which the plurality of pieces of original data are arranged is composed of a plurality of matrices, and each time the plurality of pieces of second data supplied to the selectors vary, the plurality of pieces of first data from the different matrices are supplied to the plurality of product-sum arithmetic circuits, wherein the data generation method further comprises:
  an important degree setting step of setting an important degree to each row of the plurality of matrices; and
  a row number setting step of obtaining, in the plurality of matrices, the number of rows to be left for each matrix based on the important degree set in the important degree setting step according to a specified value for specifying the number of rows to be left, and wherein the predetermined value is set so that the number of rows obtained in the row number setting step is maintained for each column of the matrices.

* * * * *